US012639699B1

(12) United States Patent
James et al.

(10) Patent No.: US 12,639,699 B1
(45) Date of Patent: May 26, 2026

(54) KEY SHARDING HIERARCHY AND SHARED CUSTODY BLOCKCHAIN WALLETS

(71) Applicant: Gemini IP, LLC, New York, NY (US)

(72) Inventors: Daniel William Halley James, Brooklyn, NY (US); Nikita Lesnikov, Minsk (BY); Aliaksei Dziadziuk, Minsk (BY)

(73) Assignee: Gemini IP, LLC, New York, NY (US)

( * ) Notice: Subject to any disclaimer, the term of this patent is extended or adjusted under 35 U.S.C. 154(b) by 282 days.

(21) Appl. No.: 18/104,102

(22) Filed: Jan. 13, 2023

Related U.S. Application Data

(60) Provisional application No. 63/329,823, filed on Apr. 11, 2022.

(51) Int. Cl.
| *G06Q 20/36* | (2012.01) |
| *G06Q 20/38* | (2012.01) |
| *G06Q 20/40* | (2012.01) |

(52) U.S. Cl.
CPC ..... *G06Q 20/3674* (2013.01); *G06Q 20/3672* (2013.01); *G06Q 20/389* (2013.01); *G06Q 20/401* (2013.01)

(58) Field of Classification Search
CPC ........... G06Q 20/3674; G06Q 20/3672; G06Q 20/389; G06Q 20/401
See application file for complete search history.

(56) References Cited

U.S. PATENT DOCUMENTS

| 11,128,448 B1 * | 9/2021 | Bernat | .................... G06F 21/40 |
| 2018/0054316 A1 * | 2/2018 | Tomlinson | ............ H04L 9/3242 |

| 2018/0157853 A1 * | 6/2018 | Kumar | ................ G06F 12/1408 |
| 2019/0035018 A1 * | 1/2019 | Nolan | ................ G06Q 20/3829 |
| 2019/0266576 A1 * | 8/2019 | McCauley | ....... G06Q 20/40145 |
| 2020/0213104 A1 * | 7/2020 | Kurian | ................... G06Q 40/06 |
| 2020/0213113 A1 * | 7/2020 | Savanah | ................ H04L 9/085 |
| 2020/0344070 A1 * | 10/2020 | Li | ........................ H04L 9/3247 |
| 2021/0036841 A1 * | 2/2021 | Craige | ................ H04L 9/0861 |
| 2021/0383363 A1 * | 12/2021 | Smirnov | ........... G06Q 20/3674 |
| 2022/0116226 A1 * | 4/2022 | Jarjoui | ................ H04L 9/0827 |
| 2022/0123929 A1 * | 4/2022 | Johnson | ............... H04L 9/0863 |

OTHER PUBLICATIONS

D. Duane Booher et al., Dynamic Key Generation for Polymorphic Encryption, Mar. 14, 2019, IEEE, pp. 482-487 (Year: 2019).*

* cited by examiner

*Primary Examiner* — Nilesh B Khatri

(74) *Attorney, Agent, or Firm* — Lee & Hayes, P.C.

(57) ABSTRACT

Systems and methods for providing a shared custody blockchain wallet as a service are disclosed. A digital asset exchange platform offering the blockchain wallet service may cause one or more groups of signing client devices to collaboratively generate one or more key unique key shards for authorizing transactions associated with the blockchain wallet. The digital asset exchange platform may determine one or more signing client groups to generate and/or store the key shards. One or more signing client devices of the individual groups of singing client devices may be configured to generate, store, and/or send unique key shards. Each of the groups may have a quorum representing ones or more thresholds and/or requirements of the unique key shards that, upon request to sign a transaction, must be utilized to authorize the transaction.

20 Claims, 9 Drawing Sheets

400

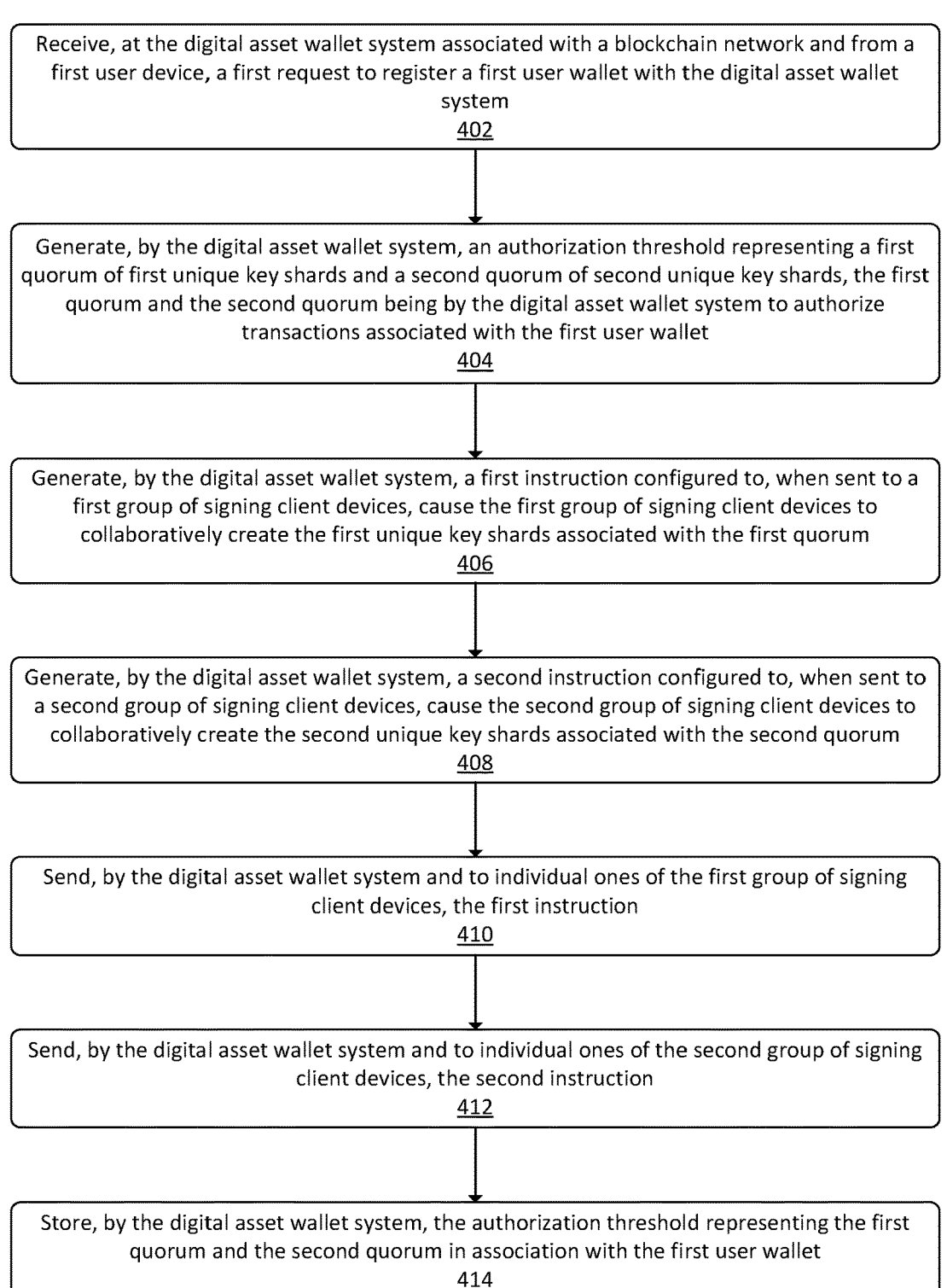

Receive, at the digital asset wallet system associated with a blockchain network and from a first user device, a first request to register a first user wallet with the digital asset wallet system
402

Generate, by the digital asset wallet system, an authorization threshold representing a first quorum of first unique key shards and a second quorum of second unique key shards, the first quorum and the second quorum being by the digital asset wallet system to authorize transactions associated with the first user wallet
404

Generate, by the digital asset wallet system, a first instruction configured to, when sent to a first group of signing client devices, cause the first group of signing client devices to collaboratively create the first unique key shards associated with the first quorum
406

Generate, by the digital asset wallet system, a second instruction configured to, when sent to a second group of signing client devices, cause the second group of signing client devices to collaboratively create the second unique key shards associated with the second quorum
408

Send, by the digital asset wallet system and to individual ones of the first group of signing client devices, the first instruction
410

Send, by the digital asset wallet system and to individual ones of the second group of signing client devices, the second instruction
412

Store, by the digital asset wallet system, the authorization threshold representing the first quorum and the second quorum in association with the first user wallet
414

FIG. 4

600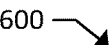

Store, by the digital asset wallet system associated with a blockchain network, a first user wallet and a first authorization threshold representing first quorum of first unique key shards and a second quorum of second unique key shards, the first quorum and the second quorum being required to authorize transactions associated with the first user wallet
602

Determine, by the digital asset wallet system, to generate third unique key shards associated with at least one of the first quorum or the second quorum
604

Generate, by the digital asset wallet system, an instruction configured to, when sent to a first group of signing client devices, cause the first group of signing client devices to collaboratively create the third unique key shards associated with at least one of the first quorum or the second quorum
606

Send, from the digital asset wallet system and to individual ones of the first group of the signing client devices, the instruction
608

Store, by the digital asset wallet system, a second authorization threshold representing the third unique key shards in association with at least one of the first quorum or the second quorum associated with the first user wallet
610

FIG. 6

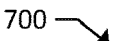

700

| Bank 702(a) | Bank 702(b) | Bank 702(n) |
|---|---|---|
| User 1 Bank Account 704(a) | User 2 Bank Account 704(b) | User N Bank Account 704(n) |

. . .

| User 1 Device 706(a) | User 2 Device 706(b) | User N Device 706(n) |
|---|---|---|
| User 1 Digital Client 708(a) | User 2 Digital Client 708(b) | User N Digital Client 708(n) |

. . .

710

Digital Asset Exchange Computer System 712

Exchange Digital Asset Client 714

Exchange Digital Asset Ledger Database(s) 716

Exchange Fiat Ledger Database(s) 718

Exchange Bank 720

Exchange Bank Account 722

FIG. 7

800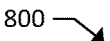

Digital Asset Exchange 802

Digital Asset Exchange Computer System 712

Exchange Digital Asset Client 714

Exchange Digital Asset Ledger Database(s) 716

Exchange Electronic Digital Asset Ledger 804

Exchange Fiat Ledger Database(s) 718

Exchange Electronic Fiat Ledger 806

Exchange Digital Asset Vault 808

Exchange Pooled Customer Digital Asset Account(s) 810

Authenticator Computer System 812

Index Computer System 814

Market Maker Computer System 816

Bank 818

Customer Fiat Bank Account 820

User device 706(a)

Digital Asset Client 822

Transaction Ledger 824

Digital Asset Source Code 826

Digital Asset Transaction Ledger 828

Exchange Bank 720

Exchange Bank Account 722

KEY SHARDING HIERARCHY AND SHARED CUSTODY BLOCKCHAIN WALLETS

CROSS REFERENCE TO RELATED APPLICATIONS

This application claims priority to U.S. Provisional Patent Application No. 63/329,823, filed Apr. 11, 2022, the entire contents of which are incorporated herein by reference.

BACKGROUND

Digital asset exchange platforms provide users with a means to send and/or receive digital assets, such as digital assets. Users holding digital assets (e.g., coins, tokens, etc.) are often required to manage a blockchain wallet holding a balance of such digital assets. Additionally, such users are burdened with the responsibility of maintaining a private key used to sign transactions associated with their blockchain wallet. However, if the private key is lost or compromised, the balance of digital assets in their blockchain wallet may be irretrievably lost or stolen. Moreover, many users do not possess the technical expertise and/or resources required to provide adequate security for a private key and may feel uncomfortable entrusting the private key for their blockchain wallet(s) to a third-party service.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example process for a digital asset exchange platform to cause respective groups of signing clients to generate unique key shards associated with a blockchain wallet.

FIG. 6 illustrates a flow diagram of an example process for a digital asset exchange platform to cause signing client groups to generate new unique key shards associated with a blockchain wallet, and invalidate the previous unique key shards associated with the blockchain wallet.

FIG. 7 illustrates a schematic diagram of exemplary participants in a system employing a digital asset exchange.

FIG. 8 illustrates a schematic diagram of additional features associated with a digital asset exchange.

DETAILED DESCRIPTION

Figure 1:
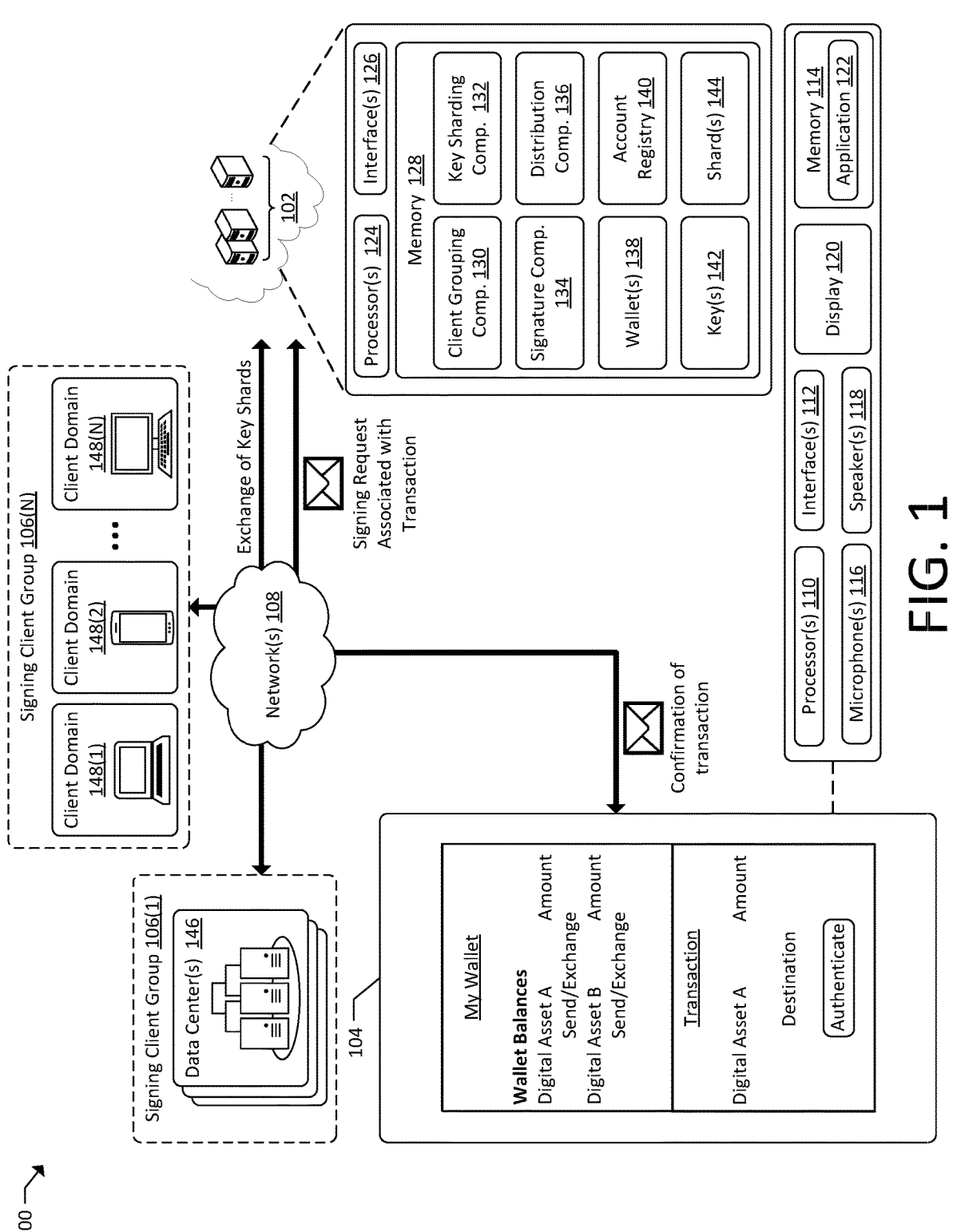
FIG. 1 illustrates an example environment for a digital asset exchange platform.

Systems and methods are provided for a shared custody blockchain wallet as a service. A user opens a user account with a digital asset exchange platform that provides customers with a service configured to manage digital assets (e.g., tokens, coins, etc.) in a blockchain wallet and sign transactions associated with the blockchain wallet (e.g., using a corresponding private key) by gathering a threshold amount of distributed portions representing the private key from groups of signing client devices. The groups of signing client devices may store, and upon request, provide respective portions, also referred to herein as shards, of a private key utilized by the digital asset exchange platform to authorize (e.g., sign) transactions associated with a user blockchain wallet of a user account. In some examples, a private key may be produced when a threshold number of respective shards associated with the private key are received by the digital asset exchange platform. Each of the groups may be established with signing client devices configured as computer systems with different characteristics, such as, for example, datacenter-based computing systems, commodity computer systems deployed outside of a datacenter, cloud-based services associated with the digital asset exchange platform, and/or the like. Additionally, or alternatively, each of the signing client devices may be controlled by different individuals or entities. By separating the groups of signing client devices in this way (e.g., based on computing system characteristics and/or deployment), risk independence between the groups may be realized. For example, to sign a transaction, unique key shards representing the private key are required from each of the groups of signing client devices associated with a blockchain wallet, where the groups of signing client devices may be provisioned in separate virtual and/or physical environments, utilize different runtime environments, and/or utilize different security environments. In this way, storing and/or utilizing first unique shards associated with a first group of signing client devices having a lesser level of security may still be beneficial, as a second unique shard associated with a second group of signing client devices, having a greater level of security, may still be required to authenticate a transaction. Additionally, by utilizing multiple signing client devices in a single group storing unique key shards of a private key that may satisfy a corresponding quorum, a greater level of stability may be realized. For example, if a first signing client device of a group is offline, has malfunctioned, or is otherwise unresponsive, a second signing client device may be leveraged to provide an equally sufficient unique key shard to the digital asset exchange platform. By way of example, the digital asset exchange platform may be utilized to generate and distribute unique key shards representing a private key in a new way, particularly by distributing unique key shards to individual signing client devices of a corresponding groups of signing client devices and retrieving some combination of the unique key shards required to satisfy one or more respective quorums for signing transactions associated with a blockchain wallet.

To provide these and other benefits, described herein are techniques to utilize a digital asset exchange platform with a client grouping component. To start, the digital asset exchange platform may receive a request from a user device to register for a user account associated with the digital asset exchange platform. In some examples, digital asset exchange platform may be associated with a blockchain network and may be configured to manage blockchain wallets on behalf of users registering accounts with the platform. For example, following a request to register for a user account, the digital asset exchange platform may generate a user blockchain wallet in association with the user account. The user blockchain wallet may be configured to store digital assets of one or more types (e.g., coins, tokens, and the like). In some examples, the registration request may include configuration data associated with the establishment of the user account and/or the blockchain wallet. In some examples, the configuration data may be utilized by a key sharding component of the digital asset exchange platform to determine how unique key shards may be generated for a given blockchain wallet. For example, the configuration data may indicate, for the blockchain wallet, a number of unique key shards that a corresponding private key (or other form or authorization) should be split into. In some examples, the private key and/or unique key shards may be utilized by a signature component of the digital asset exchange platform to sign transactions associated with the blockchain wallet. The configuration data may also be utilized by a client grouping component of the digital asset exchange platform to determine groups of signing clients to receive and/or store respective unique key shards and/or establish unique quorums associated with the groups of signing clients. In some examples, the signing client devices may be under control of the user, under control of the digital asset exchange platform, and/or under control of one or more third-party entities. For example, the configuration data may indicate, for the unique key associated with the blockchain wallet, types of signing client groups to be utilized by the digital asset exchange platform to store the key shards. In some examples, the configuration data may indicate that first unique key shards are to be distributed to and/or stored by a first group of signing client devices configured as datacenter-based computing systems, commodity hardware computing systems deployed outside of datacenter(s), a key storage associated with the digital asset exchange platform, and/or the like. Additionally, or alternatively, the configuration data may indicate that second unique key shards (or third unique key shards, or fourth unique key shards, and so on and so forth) are to be distributed and/or stored by a second group of signing client devices different from the first group and configured as datacenter-based computing systems, commodity hardware computing systems deployed outside of datacenter(s), a key storage associated with the digital asset exchange platform, and/or the like. Further, the configuration data may be utilized by a signing component of the digital asset exchange platform to determine one or more quorums (e.g., a threshold number of unique key shards, a specific configuration of the unique key shards, and/or any requirement associated with unique key shards associated with a given signing client group) required to authorize transactions associated with a blockchain wallet. In some examples, each of the quorums may be unique. For example, the configuration data may indicate, for each group of signing client devices, a quorum associated with unique key shards stored by a given group of signing client devices, required by the digital asset exchange platform to sign a transaction associated with the blockchain wallet.

In some examples, the digital asset exchange platform may store information associated with signing client devices, such as, for example, a location (e.g., a city, state, country, geolocation, etc.) of a signing client device, a configuration (e.g., datacenter-based, commodity hardware outside of a datacenter, etc.) of a signing client device, a status (e.g., online, offline, over throttled, under throttled, etc.) of a signing client device, hardware associated with a signing client device, software associated with a signing client device, and/or an identifier of a signing client device. Additionally, or alternatively, the digital asset exchange platform may store default configuration data to be utilized by the key sharding component, the client grouping component, the signature component, and/or the digital asset exchange platform, such that a default configuration may be employed configuring groups of signing client devices to generate, receive, and/or store respective unique key shards in association with various corresponding quorums.

Key shards may be generated in various ways. In some examples, the key shards may be generated by the key sharding component using various techniques. Additionally, or alternatively, the key shards may be generated by the groups of signing clients. For example, the groups of signing clients may be communicatively coupled and work cooperatively to generate unique key shards associated with a blockchain wallet. In some examples, the key sharding component and/or the signing client devices may utilize a sharding algorithm, such as, for example, algorithmic sharding, linear hash sharding, consistent hash sharding, range sharding, and/or any other sharding algorithm to generate the key shards. Additionally, or alternatively, the key sharding component and/or the signing client devices may utilize a secret sharing algorithm, such as, for example, Shamir's secret sharing algorithm, Blakely's secret sharing algorithm, Mignotte's secret sharing algorithm, Asmuth-Bloom's secret sharing algorithm, and/or any other secret sharing algorithm to generate the key shards.

Once the digital asset exchange platform has determined the signing client devices to generate the key shards, determined the groups of signing clients, and/or determined a quorum for each group of signing client devices, a distribution component of the digital asset exchange platform may be configured to distribute instructions for generating the key shards to individual signing client devices associated with corresponding groups of signing clients. In some examples, the distribution component may utilize one or more secure communication tunnels to send and/or receive communications (e.g., requests, instructions, key shards, etc.) associated with signing client devices. Take, for example, a private key being split into two key shards. The distribution component may send first instructions for generating first unique key shards to each signing client device of a first group of signing client devices and/or second instructions for generating second unique key shards to each signing client device of a second group of signing client devices. In some examples, the first group of signing client devices may be configured as datacenter-based computer systems having a first number of signing client devices (e.g., three datacenter-based signing client devices) and/or the second group of signing client devices may be configured as commodity hardware computing systems (e.g., personal computers in remote home offices, personal mobile computing devices, etc.) having a first number of signing client devices (e.g., ten personal computing devices deployed outside of a data center). In such an example, the signature component may configure the first group of signing client devices with a first quorum (e.g., being satisfied by one shard associated with a particular group of signing client devices) and/or the second group of signing client devices with a second quorum (e.g., being satisfied by one of various combinations of three particular shards associated with a particular group of signing client devices). For example, such a configuration would require one of the three signing client devices associated with the first group to return a first unique key shard to the digital asset exchange platform and/or three of the ten signing client devices associated with the second group to return one of various particular combinations of the second unique key shards to the digital asset exchange platform upon request in order to authorize a transaction.

While the above example describes unique key shards associated with two groups of signing client devices, any number of unique shards and/or groups of signing client devices may be utilized to implement the technologies disclosed herein. Additionally, or alternatively, while the above example describes the first group having three signing client devices and a first quorum of one of the first unique key shards and the second group having ten signing client devices and second quorum of various particular combinations of three of the second unique key shards, groups may be configured having any number of signing client devices and a quorum representing any number, combination, or particular arrangement of unique key shards required to authorize a transaction for a blockchain wallet.

The digital asset exchange platform may then store information associated with the blockchain wallet. For example, the digital asset exchange platform may store a blockchain wallet, a shard configuration of the blockchain wallet, a configuration of groups of signing clients configured to generate and/or store respective shards, quorums associated with respective groups of signing clients and/or key shards, an identifier of the user device, an identifier of the user account, and/or an identifier of the blockchain wallet. The digital asset exchange platform may then send the identifier of the blockchain wallet to the user account and/or to the user device, where the user may utilize the identifier with the digital asset exchange platform to uniquely identify the blockchain wallet from among various blockchain wallets.

Additionally, or alternatively, the digital asset exchange platform may be configured to sign transactions associated with a blockchain wallet. For example, the digital asset exchange platform may receive a request to sign a transaction (e.g., using a private key) associated with a user blockchain wallet. In some examples, the request may be received from a user device, a user account, and/or a third-party (e.g., a vendor) and the transaction may represent a request to send digital assets from the user blockchain wallet to a destination blockchain wallet. Responsive to the request, the digital asset exchange platform may identify one or more groups of signing client devices storing unique key shards associated with the blockchain wallet. In some examples, the groups of signing client devices may be determined based on the user blockchain wallet. That is, as previously described, the digital asset exchange platform may store an association between the groups of signing client devices and the user blockchain wallet or an identifier thereof. Considering the example described above, the client grouping component of the digital asset exchange platform may identify the first group of signing client devices storing the first unique key shards and the second group of signing client devices storing the second unique key shards.

The distribution component of the digital asset exchange platform may then send a request for the key shards associated with the blockchain wallet to the identified groups of signing client devices. For example, the distribution component may send a request for the first unique key shards to each of the three signing client devices associated with the first group. Additionally, or alternatively, the distribution component may send a request for the second unique key shards to each of the ten signing client devices associated with the second group. The digital asset exchange platform may be configured to wait for a threshold period of time for response from the groups of signing client devices. Following a lapse of the threshold period of time, the digital asset exchange platform may be configured to resend the request to the signing client devices and/or reject the request to sign the transaction. The individual signing client devices of both the first group and the second group may respond with their respective unique key shard. For example, one or more first signing clients of the first group may send a first unique key shard of the first key shards to the digital asset exchange system. Additionally, or alternatively, one or more second signing clients of the second group may send a second unique key shard of the second key shards to the digital asset exchange platform. Following a lapse of the threshold period of time, the signature component of the digital asset exchange platform may determine whether the key shards (or signatures) received from the signing client devices are sufficient to satisfy a corresponding quorum associated with the blockchain wallet.

A quorum may comprise various thresholds that must be met to satisfy the quorum, as described herein. Considering the example described above, the signature component may determine whether the first unique key shards received from the first group of signing client devices satisfies the first quorum associated with the blockchain wallet (e.g., one shard of the first unique key shards). Additionally, or alternatively, the signature component may determine whether the second key shards received from the second group of signing client devices satisfies the second quorum associated with the blockchain wallet (e.g., being satisfied by various combinations of three key shards of the second unique key shards). For example, if one or more of the three signing clients in the first group returns one of the first unique key shards, the signature component may determine that the first quorum is satisfied. Additionally, or alternatively, if three or more of the ten signing clients in the second group returns three or more of the second key shards that satisfy one of the various combinations of the second unique key shards, the signature component may determine that the second quorum is satisfied. Additionally, or alternatively, if the first quorum and the second quorum is satisfied, the signature component may determine that the overall quorum (or key shard threshold) associated with the blockchain wallet is satisfied. In this way, if a first signing client of the first group of signing clients is offline, slow to respond, and/or otherwise unresponsive, a second signing client device and/or a third signing client device of the first group may provide one of the first unique key shards resulting in authorization of the transaction where prior systems would have to wait for the first signing client to respond to authorize (or sign) the transaction.

In examples where the quorum associated with a blockchain wallet is satisfied, the signature component may sign the transaction associated with the blockchain wallet. For example, once the quorum associated with the blockchain wallet is satisfied, the private key may be accessed, received, and/or otherwise produced for use by the digital asset exchange platform. For example, the key sharding component of the digital asset exchange platform may utilize the received unique key shards to produce the private key, which the signature component may utilize to sign the transaction. Once the transaction is signed, the digital asset exchange platform may submit the signed transaction to the blockchain network. For example, the transaction may correspond to a particular type of cryptocurrency, and the digital asset exchange platform may submit the signed transaction to a blockchain corresponding to the type of the cryptocurrency associated with the transaction.

Additionally, or alternatively, the digital asset exchange platform may be configured to generate new key shards associated with a blockchain wallet. For example, the digital asset exchange platform may store first configuration data representing a first set of unique key shards (e.g., the first unique key shards and the second unique key shards) associated with one or more quorums of a blockchain wallet. The key sharding component may determine to generate a second set of unique key shards associated with the one or more quorums. In some examples, such a determination may be based on a request received from the user device and/or the user account, data received from one or more signing client devices (e.g., a disassociation of a signing client device from the user account, an indication that a number of active signing client devices in a group of signing client devices does not meet a threshold number of signing client devices, etc.), and/or as a part of a configuration of the blockchain wallet (e.g., after a threshold period of time new key shards may be required for added security). As such, the key sharding component may generate instructions, to send to the signing client devices associated with the blockchain wallet, causing the signing client devices to generate a second set of unique key shards including, for example, third unique key shards associated with one or more quorums of the blockchain wallet.

Responsive to generating the instructions causing the signing client devices to generate the second set of unique key shards, the distribution component may be configured to distribute the instructions to the previous groups of signing client devices (e.g., the first group and/or the second group), to one or more new groups of signing client devices (e.g., a third group), or a combination thereof using any of the techniques described herein. In some examples, distribution of the instructions to the previous groups of signing client devices may cause the previous group of signing client devices to discard the first set of key shards. Additionally, or alternatively, the distribution component may send a message to the previous groups of signing client devices indicating that the first set of key shards has been revoked (e.g., is no longer valid to produce the private key). During generation of the second set of key shards, the signature component may also determine new quorums associated with the second set of key shards and/or modify the existing quorums to include the third unique key shards. The digital asset exchange platform may then store indications of the second set of unique key shards, indications of the one or more groups of signing client devices, and/or new quorums in association with the blockchain wallet. In some examples, storing of the information associated with the second set of key shards may cause the first set of key shards to be invalidated and/or discarded.

While generation of unique key shards (e.g., of a private key) are described, unique key subshards of unique key shards may be generated using the techniques described herein. For example, a first unique key shard described above may be split into first unique key subshards, wherein a quorum of first unique key subshards may be required by a first device, system, and/or application in order for a second device, system, and/or application to produce the first unique key shard. In this way, a hierarchy of unique key shards may be created to authorize a transaction. For example, a first signing client device storing the unique first key shard may have one or more applications configured to generate and/or store one or more first unique key subshards. In such an example, in order for the first signing client device to produce the first unique key shard to send to the digital asset exchange platform, the first signing client device would need to satisfy a quorum of the first key unique subshards from the applications. Additionally, or alternatively, while generation of key shards and/or key subshards of key shards of a private key are described, the generation of key shards and/or key subshards of key shards of any type of key may be generated using the techniques described herein.

In addition to the above, one or more user interfaces may be generated and configured to display relevant information associated with the digital asset exchange platform. For example, a first user interface may be configured to present information associated with the user account. The information may include a transaction history indicating transactions associated with the user account, amounts of the transactions, a date of the transactions, and/or a request to authorize a transaction.

The user interfaces may also be configured to display user preferences and to receive user input associated with user preferences. For example, preferences associated with cryptocurrency types, preferred distribution wallets, preferred signing client devices, and/or any other preference associated with a blockchain wallet and/or the authorization of a transaction.

By utilizing the techniques described herein, a digital asset exchange platform may sign transactions associated with a blockchain wallet using unique key shards generated by and/or stored on disparate devices that lead to greater security of the blockchain wallet and reduced risk of losing access to the blockchain wallet, as well as higher customer engagement. All of this can be done in near-real time, including generating, sending, and/or receiving of unique key shards. Additionally, transaction authorizations may have an increased rate of success given that a number of signing client devices may store unique key shards (e.g., ten signing client devices in a group), but only a quorum of the signing client devices are required to provide their respective unique key shard (e.g., various combinations of three particular signing client devices of the ten). Further, by utilizing different configurations of computing systems configured as signing client devices (e.g., datacenter-based signing clients and signing clients provisioned outside of a datacenter), security is increased as datacenter-based clients may have a greater level of security than signing clients provisioned outside of a datacenter. By doing so, barriers to entry into the digital asset market are reduced (e.g., hesitancy to entrust a third-party with a private key of a blockchain wallet) and that user can not only feel secure about the digital assets of their blockchain wallet but also can ensure increased recovery options should a device storing a unique key shard fail to operate.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates an example environment 100 for a digital asset exchange platform (also referred to herein as a digital asset wallet system). The environment 100 may include, for example, a digital asset exchange system 102, a user device 104, and/or one or more signing client group(s) 106. The components of each of these devices and/or systems will be described below by way of example. Each of the devices and/or systems may be configured to communicate with each other via one or more networks 108. Specifically, the digital asset exchange system 102 may be configured to perform various processes as described herein and to send and/or receive unique key shards and/or instructions associated with the key shards associated with a blockchain wallet to signing client group(s) 106 and/or user interface commands and/or other commands associated with a blockchain wallet to the user device 104.

As to the user device 104, it may include one or more components including, for example, one or more processors 110, one or more network interfaces 112, memory 114, one or more microphones 116, one or more speakers 118, and/or a display 120. The microphones 116 may be configured to receive audio and to generate corresponding audio data. The speakers 118 may be configured to received audio data and to output audio corresponding to that audio data. The displays 120 may be configured to receive data, such as text data and/or image data for example, and to display images and/or other content corresponding to the received device. Additionally, the memory 114 of the user device 104 may include one or more applications 122. The applications 122 may be associated with the digital asset exchange system 106 and/or one or more systems associated with the payment instrument, particularly where the payment instrument is not provided by the digital asset exchange system 102. The applications 122 may be configured to display user interfaces for the viewing of content as described herein and/or for the receipt of user input on the user devices 104. In some examples, the user interfaces may be presented via one or more application programming interfaces (API)s associable by the user via the user devices 104.

The digital asset exchange system 106 may include one or more components such as, for example, one or more processors 124, one or more network interface 126, and/or memory 128. The memory 128 may include components such as, for example, a client grouping component 130, a key sharding component 132, a signature component 134, a distribution component 136, one or more wallets 138, an account registry 140, one or more key(s) 142, and/or one or more shard(s) 144 of the key(s) 142. Each of these components will be described below.

The digital asset exchange platform 102 may receive a request from a user device to register for a user account associated with the digital asset exchange platform 102. In some examples, the digital asset exchange platform 102 may be associated with a blockchain network and may be configured to manage wallets on behalf of users registering accounts with the platform 102. For example, following a request to register for a user account, the digital asset exchange platform 102 may generate a user wallet 138 in association with the user account. The user wallet 138 may be configured to store digital assets of one or more types (e.g., coins, tokens, and the like). In some examples, the registration request may include configuration data associated with the establishment of the user account and/or the wallet 138. Additionally, or alternatively, the digital asset exchange platform 102 may store default configuration data to be utilized by the client grouping component 130, the key sharding component 132, the signature component 134, and/or the digital asset exchange platform 102, such that a default configuration may be employed configuring groups of signing client devices to generate, receive, and/or store unique key shards (e.g., of a private key 142) in association with various signature thresholds.

In some examples, the digital asset exchange platform 102 may store information associated with signing client devices, such as, for example, a location (e.g., a city, state, country, geolocation, etc.) of a signing client device, a configuration (e.g., datacenter-based, commodity hardware outside of a datacenter, etc.) of a signing client device, a status (e.g., online, offline, over throttled, under throttled, etc.) of a signing client device, hardware associated with a signing client device, software associated with a signing client device, and/or an identifier of a signing client device.

The client grouping component 130 may also utilize the configuration data to determine signing client groups 106 (1)-(N) to generate and/or store unique key shards 144. In some examples, the signing client devices included in the signing client groups 106(1)-(N) may be under control of the user, under control of the digital asset exchange platform 102, and/or under control of one or more third-party entities. For example, the configuration data may indicate, for the unique key shards 144 associated with the wallet 138, types of signing client groups 106(1)-(N) to be utilized by the digital asset exchange platform to generate and/or store the key shards. In some examples, the configuration data may indicate that first key shards 144are to be generated by and/or stored by signing client devices of a first signing client group 106(1) configured as datacenter-based computing systems 146, commodity hardware computing systems deployed outside of datacenter(s), a key storage associated with the digital asset exchange platform 102, and/or the like. Additionally, or alternatively, the configuration data may indicate that second key shards 144 are to be generated by and/or stored by signing client devices of a second signing client group 106(N) different from the first group and configured as datacenter-based computing systems, commodity hardware computing systems deployed outside of datacenter(s), a key storage associated with the digital asset exchange platform, and/or the like. As illustrated in FIG. 1, the first signing client group 106(1) includes signing client devices configured as data center 146 signing client devices and the second signing client group 106(N) includes signing client devices configured as signing client devices associated with one or more client domains 148(1)-(N). In some examples, the signing client devices in the second signing client group 106(N) may be configured as commodity hardware computing systems deployed outside of datacenters, such as, for example, a laptop, a mobile device, a desktop computer, or any other commodity hardware.

The key sharding component 132 may utilize the configuration data to generate instructions, to send to signing client groups 106, causing the individual signing client devices of the signing client groups 106 to generate unique key shards 144. In some examples, the instructions may be configured to cause a signing client group 106 to collaboratively create the unique key shards 144. For example, the configuration data may indicate, for a given wallet 138, a configuration of the unique key shards 144. The key sharding component 132 and/or the signing client groups 106 may generate key shards 144 in various ways. For example, the key sharding component 132 and/or the signing client groups 106 may utilize a sharding algorithm, such as, for example, algorithmic sharding, linear hash sharding, consistent hash sharding, range sharding, and/or any other sharding algorithm to generate key shards 144 of a private key 142. Additionally, or alternatively, the key sharding component 132 and/or the signing client groups 106 may utilize a secret sharing algorithm, such as, for example, Shamir's secret sharing algorithm, Blakely's secret sharing algorithm, Mignotte's secret sharing algorithm, Asmuth- Bloom's secret sharing algorithm, and/or any other secret sharing algorithm to generate key shards 144 of a private key 142. As previously described, the key shards 144 may be generated by the signing client groups 106(1)-(N) at the time the private key 142 and/or the wallet 138 is generated using any of the techniques described herein with respect to the key sharding component 132.

The signature component 134 may also utilize the configuration data to determine a quorum of signing client devices (or shards 144) associated with a group of signing client device 106 required to authorize transactions associated with a wallet 138. For example, the configuration data may indicate, for each signing client group 106(1)-(N), a quorum of a the unique shards 144 required by the digital asset exchange platform 102 to sign a transaction associated with the wallet 138. Additionally, or alternatively, the signature component 134 may be configured to sign a transaction associated with a user wallet 138 with a private key 142.

The distribution component 136 may be configured to distribute the instructions to generate the key shards 144 to individual signing client devices associated with corresponding signing client groups 106(1)-(N) following the generation of the instructions, the determination of the signing client groups 106, and/or the determination of the quorum for each signing client groups 106. In some examples, the distribution component 136 may utilize one or more secure communication protocols to send and/or receive communications (e.g., instructions, requests, key shards 144, etc.) associated with signing client devices. Take, for example, a private key 142 being split into two key shards 144. The distribution component 136 may send first instructions for generating the first unique key shards 144 to each signing client device of a first signing client group 106(1) and/or second instructions for generating the second key unique shards 144 to each signing client device of a second signing client group 106(N). In some examples, the first signing client group 106(1) may be configured as datacenter-based computer systems 146 having a first number of signing client devices (e.g., three datacenter-based signing client devices) and/or the second signing client group 106 (N) may be configured as commodity hardware computing systems associated with client domains 148(1)-(N) (e.g., personal computers in remote home offices, personal mobile computing devices, etc.) having a first number of signing client devices (e.g., ten personal computing devices deployed outside of a data center).

In such an example, the signature component 134 may configure the signing client group 106(1) with a first quorum (e.g., being satisfied by one shard 144) and/or the second signing client group 106(N) with a second quorum (e.g., being satisfied by one of various combinations of three particular shards 144 associated with the second signing client group 106(N)). For example, such a configuration would require one of the three signing client devices associated with the first signing client group 106(1) to return a first unique key shard 144 to the digital asset exchange platform 102 and/or three of the ten signing client devices associated with the second signing client group 106(N) to return one of the various particular combinations of the second unique key shards 144 to the digital asset exchange platform 102 upon request in order to authorize a transaction (or produce the private key 142).

While the examples described herein describe unique key shards 144 associated with two signing client groups 106, any number of unique shards 144 may be generated and/or the client grouping component 130 may determine any number of signing client groups 106 to implement the technologies disclosed herein. Additionally, or alternatively, while the above example describes the first signing client group 106(1) having three signing client devices and a first quorum of one of the first unique key shards 144 and the second signing client group 106(N) having ten signing client devices and a second quorum of various particular combinations of three of the second unique key shards 144, the client grouping component 130 may configured the groups to have any number of signing client devices and/or the signature component 134 may determine a quorum representing any number of the number, combination, or particular arrangement of unique key shards required to authorize a transaction for a wallet 138.

The digital asset exchange platform 102 may then store information associated with the wallet(s) 138. For example, the digital asset exchange platform 102 may store a wallet 138, a shard configuration of the wallet 138, a configuration of signing client groups 106 configured to generate and/or store respective shards 144, quorums associated with respective signing client groups 106 and/or key shards 144, an identifier of the user device 104, an identifier of the user account, and/or an identifier of the wallet 138. The digital asset exchange platform 102 may then send the identifier of the wallet 138 to the user account and/or to the user device 104, where the user may utilize the identifier with the digital asset exchange platform 102 to uniquely identify the wallet 138 from among various wallets 138.

Additionally, or alternatively, the digital asset exchange platform 102 may be configured to sign transactions associated with a wallet 138. For example, the digital asset exchange platform 102 may receive a request to sign a transaction (e.g., using a private key 142) associated with a user wallet 138. In some examples, the request may be received from a user device 104, a user account, and/or a third-party (e.g., a vendor) and the transaction may represent a request to send digital assets from the user wallet 138 to a destination wallet 138. Responsive to the request, the client grouping component 130 may identify one or more signing client groups 106 storing key shards 144 of the private key 142 (or signatures associated with the private key 142) associated with the wallet 138. In some examples, the signing client groups 106 may be determined based on the user wallet 138. That is, as previously described, the digital asset exchange platform 102 may store an association between the signing client groups 106 and the user wallet 138 or an identifier thereof. Considering the example described above, the client grouping component 136 may be configured to identify the first signing client group 106(1) storing the first unique key shards 144 and the second signing client group 106(N) storing the second unique key shards 144.

The distribution component 136 may be configured to send a request for the key shards 144 associated with the wallet 138 to the identified signing client groups 106. For example, the distribution component 136 may send a request for the first unique key shards 144 to each of the three signing client devices associated with the first signing client group 106(1). Additionally, or alternatively, the distribution component 136 may send a request for the second unique key shards 144 to each of the ten signing client devices associated with the second signing client group 106(N). The digital asset exchange platform 102 may be configured to wait for a threshold period of time for response from the signing client groups 106. Following a lapse of the threshold period of time, the digital asset exchange platform 102 may be configured to resend the request to the signing client groups 106 and/or reject the request to sign the transaction.

The individual signing client devices of both the first signing client group 106(1) and the second signing client group 106(N) may respond with their respective unique key shard 144. For example, one or more first signing clients of the first signing client group 106(1) may send a first unique key shard 144 of the first unique key shards 144 to the digital asset exchange platform 102. Additionally, or alternatively, one or more second signing clients of the second signing client group 106(N) may send a second unique key shard 144 of the second unique key shards 144 to the digital asset exchange platform 102. Following a lapse of the threshold period of time, the signature component 134 may be configured to determine whether the key shards 144 received from the groups of signing client devices 106 are sufficient to satisfy a quorum associated with the wallet 138.

A quorum may comprise various thresholds that must be met to satisfy the quorum, as described herein. Considering the example described above, the signature component 134 may determine whether the first unique key shards 144 received from the first signing client group 106(1) satisfies the first quorum associated with the wallet 138 (e.g., a threshold of one shard 144 of the first unique key shards 144). Additionally, or alternatively, the signature component 134 may determine whether the second key shards 144 received from the second signing client group 106(N) satisfies the second quorum associated with the wallet 138 (e.g., being satisfied by one of various combinations of three shards 144 of the second unique key shards 144). For example, if one or more of the three signing clients in the first signing client group 106(1) returns one of the first unique key shards 144, the signature component 134 may determine that the first quorum is satisfied. Additionally, or alternatively, if three or more of the ten signing clients in the second signing client group 106(N) returns three or more of the second key shards 144 that satisfy one of the various combinations of the second unique keys shards 144, the signature component 134 may determine that the second quorum is satisfied. Additionally, or alternatively, if the first quorum and the second quorum is satisfied, the signature component 134 may determine that the overall quorum (or key shard threshold) associated with the wallet 138 is satisfied. In this way, if a first signing client of the first signing client group 106(1) of signing clients is offline, slow to respond, and/or otherwise unresponsive, a second signing client device and/or a third signing client device of the first signing client group 106(1) may provide one of the first unique key shards 144 resulting in authorization of the transaction where prior systems would have to wait for the first signing client to respond to authorize (or sign) the transaction.

In examples where the quorum associated with a wallet 138 is satisfied, the signature component 134 may sign the transaction associated with the wallet 138. For example, once the quorum(s) associated with the wallet 138 is satisfied, the private key 142 may be accessed, received, and/or otherwise produced for use by the digital asset exchange platform 102. For example, the key sharding component 132 may be configured to utilize the received unique key shards 144 to produce the private key 142, which the signature component 134 may utilize to sign the transaction. Once the transaction is signed, the digital asset exchange platform 102 may submit the signed transaction to the blockchain network. For example, the transaction may correspond to a particular type of cryptocurrency, and the digital asset exchange platform may submit the signed transaction to a blockchain corresponding to the type of the cryptocurrency associated with the transaction.

Additionally, or alternatively, the digital asset exchange platform 102 may be configured to generate new key shards 144 associated with a wallet 138. For example, the digital asset exchange platform 102 may store first configuration data representing a first set of unique key shards 144 (e.g., the first unique key shards and the second unique key shards) associated with the one or more quorums of a wallet 138. The key sharding component 132 may determine to generate a second set of unique key shards 144 associated with the one or more quorums. In some examples, such a determination may be based on a request received from the user device 104 and/or the user account, data received from one or more signing client devices (e.g., a disassociation of a signing client device from the user account, an indication that a number of active signing client devices in a signing client group 106 does not meet a threshold number of signing client devices, etc.), and/or as a part of a configuration of the wallet 138 (e.g., after a threshold period of time new key shards 144 may be required for added security). As such, the key sharding component 132 may generate instructions, to send to the signing client devices associated with the blockchain wallet 138, causing the signing client devices to generate a second set of unique key shards 144 including, for example, third unique key shards 144, associated with the one or more quorums of the wallet 138.

Responsive to generating the instructions causing the signing client devices to generate the second set of unique key shards 144, the distribution component 136 may be configured to distribute the instructions to the previous signing client groups 106 (e.g., the first signing client group 106(1) and/or the second signing client group 106(N)), to one or more new signing client groups 106 (e.g., a third group), or a combination thereof using any of the techniques described herein. In some examples, distribution of the instructions to the previous signing client groups 106 may cause the previous signing client groups 106 to discard the first set of key shards 144. Additionally, or alternatively, the distribution component 136 may send a message to the previous signing client groups 106 indicating that the first set of key shards 144 has been revoked (e.g., is no longer valid to produce the private key 142). During generation of the second set of key shards 144, the signature component 134 may also determine new quorums associated with the second set of key shards 144 and/or to modify the existing quorums to include the third unique key shards 144. The digital asset exchange platform 102 may then store indications of the second set of unique key shards 144, indications of the one or more signing client groups 106, and/or new quorums in association with the wallet 138. In some examples, storing of the information associated with the second set of key shards 144 may cause the first set of key shards 144 to be invalidated and/or discarded.

While generation of unique key shards 144 (e.g., of a private key 142) are described, unique key subshards of key shards 144 may be generated using the techniques described herein. For example, a first unique key shard 144 described above may be split into first unique key subshards, wherein a quorum of first unique key subshards may be required by a first device, system, and/or application in order for a second device, system, and/or application to produce the first unique key shard 144. In this way, a hierarchy of unique key shards 144 may be created to authorize a transaction. For example, a first signing client device storing the first unique key shard 144 may have one or more applications configured to generate and/or store one or more first unique key subshards. In such an example, in order for the first signing client device to produce the first unique key shard 144 to send to the digital asset exchange platform 102, the first signing client device would need to satisfy a quorum of the first unique key subshards from the applications. Additionally, or alternatively, while generation of key shards 144 and/or key subshards of key shards 144 of a private key 142 are described, the generation of key shards 144 and/or key subshards of key shards 144 of any type of key 142 may be generated using the techniques described herein.

In addition to the above, one or more user interfaces may be generated and configured to display relevant information associated with the digital asset exchange platform 102. For example, a first user interface may be configured to present information associated with the user account. The information may include a transaction history indicating transactions associated with the user account, amounts of the transactions, a date of the transactions, and/or a request to authorize a transaction.

The user interfaces may also be configured to display user preferences and to receive user input associated with user preferences. For example, preferences associated with cryptocurrency types, preferred distribution wallets, preferred signing client devices, and/or any other preference associated with a blockchain wallet 138 and/or the authorization of a transaction.

The account registry 140 may be configured to store data associated with the user accounts associated with the digital asset exchange system 102. This user account data may include, by way of example, user account identifiers, identifiers of user devices 104 associated with the user accounts, identifiers of user wallet(s) 138 associated with the user accounts, user preference information, user identifiers, user information, data on a use of the payment instrument, data on the private key(s) 142 associated with blockchain wallet(s) 138, data on key shard(s) 144 associated with private key(s) 142, data on signing client groups 106(1)-(N) configured to store the key shard(s) 144 associated with user blockchain wallet(s) 138, etc.

In addition to the above, one or more user interfaces may be generated and configured to display relevant information associated with the digital asset exchange system 102. For example, a first user interface may be configured to present information associated with the wallet 138 of the user account. The information may include a balance of crypto currency funds associated with the wallet(s) 138, a transaction history indicating transactions associated with the wallet(s) 138, amounts of the transactions, and/or dates of the transactions.

As shown in FIG. 1, several of the components of the digital asset exchange system 102 and/or the other systems and devices, and the associated functionality of those components as described herein, may be performed by one or more of the other systems and/or by the user devices 104. Additionally, or alternatively, some or all of the components and/or functionalities associated with the user devices 104 may be performed by the digital asset exchange system 102.

It should be noted that the exchange of data and/or information as described herein may be performed only in situations where a user has provided consent for the exchange of such information. For example, a user may be provided with the opportunity to opt in and/or opt out of data exchanges between devices and/or with the systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 110 and/or 124, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or 124 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or 124 may possess its own local memory, which also may store program components, program data, and/or one or more operating systems.

The memory 114 and/or 128 may include volatile and nonvolatile memory, removable and non-removable media implemented in any method or technology for storage of information, such as computer-readable instructions, data structures, program component, or other data. Such memory 114 and/or 128 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or 128 may be implemented as computer-readable storage media ("CRSM"), which may be any available physical media accessible by the processor(s) 110 and/or 124 to execute instructions stored on the memory 114 and/or 128. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or 128, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112 and/or 126 may enable messages between the components and/or devices shown in system 100 and/or with one or more other remote systems, as well as other networked devices. Such network interface(s) 112 and/or 126 may include one or more network interface controllers (NICs) or other types of transceiver devices to send and receive messages over the network.

For instance, each of the network interface(s) 112 and/or 126 may include a personal area network (PAN) component to enable messages over one or more short-range wireless message channels. For instance, the PAN component may enable messages compliant with at least one of the following standards IEEE 702.15.4 (ZigBee), IEEE 702.15.1 (Bluetooth), IEEE 702.11 (WiFi), or any other PAN message protocol. Furthermore, each of the network interface(s) 112 and/or 126 may include a wide area network (WAN) component to enable message over a wide area network.

In some instances, the digital asset exchange system 102 or portions thereof may be local to an environment associated the user device 104 and/or signing client groups 106 (1)-(N). In some instances, some or all of the functionality of the digital asset exchange system 102 may be performed by the user device 104 and/or the signing client groups 106(1). Also, while various components of the digital asset exchange system 102 have been labeled and named in this disclosure and each component has been described as being configured to cause the processor(s) to perform certain operations, it should be understood that the described operations may be performed by some or all of the components and/or other components not specifically illustrated.

Figure 2:
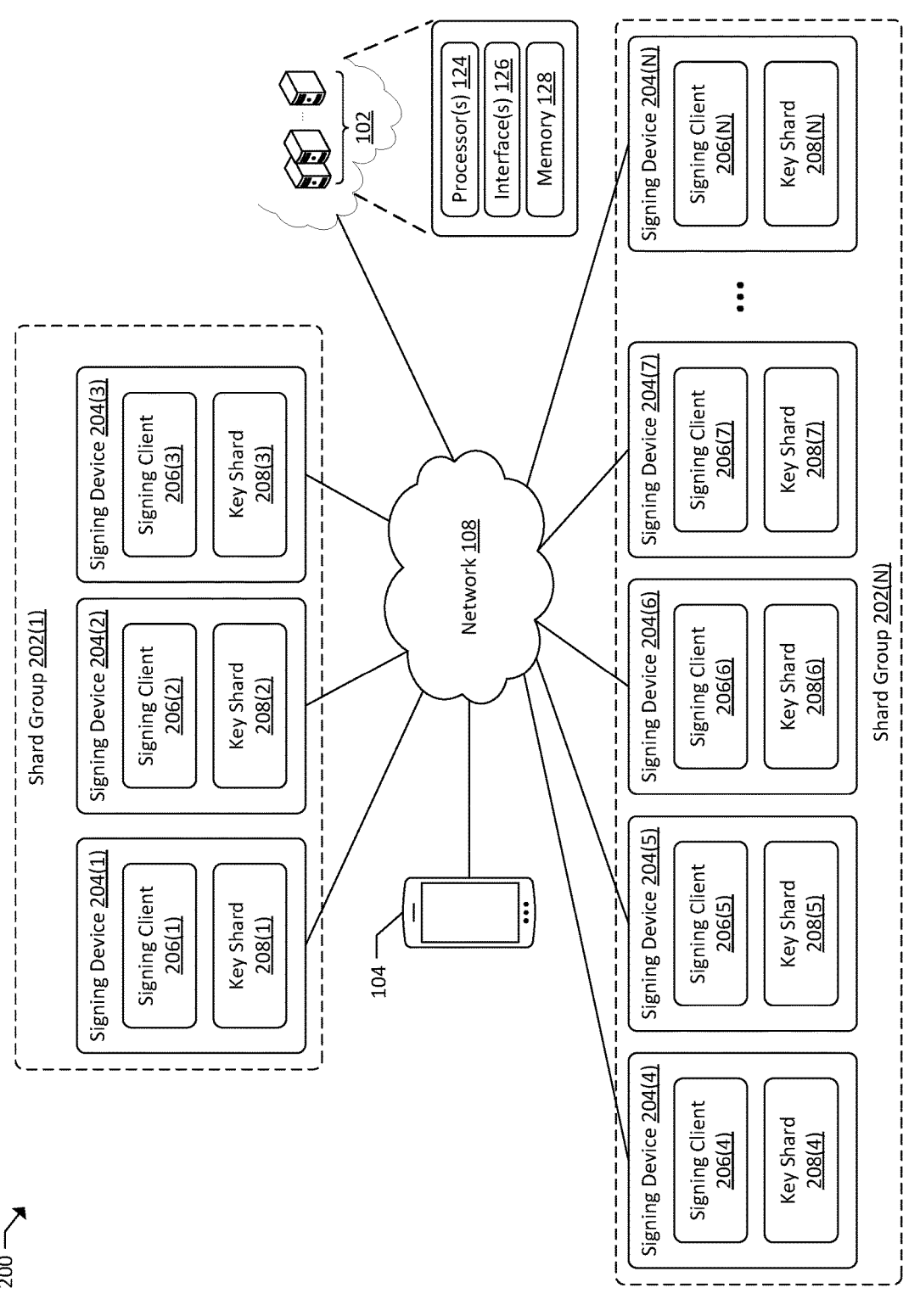
FIG. 2 illustrates another example environment for the digital asset exchange platform.

FIG. 2 illustrates another example environment 200 for the digital asset exchange platform 102. The example environment 200 may include the digital asset exchange platform 102, the user device 104, one or more shard groups 202(1)-(N), each shard group 202 including one or more signing device(s) 204(1)-(N), where N may be any integer greater than 1. Additionally, each of the signing client device(s) 202 may include a respective signing client 206 (1)-(N) and/or a key shard 208(1)-(N), where N may be any integer greater than 1. In some examples, the shard group(s) 202, the signing device(s) 204, and/or the key shards 208 may correspond to the signing client groups 106, the signing clients 146, 148, and/or the shards 144 as described with respect to FIG. 1 respectively.

As illustrated in FIG. 2, a first shard group 202(1) includes three signing devices 204(1)-(3) and a second shard group 202(N) includes five signing devices 204(4)-(N). Take, for example, a user wallet configured with a private key split into unique key shards 208(1)-(N) (e.g., two sets of unique key shards, where a first set of unique key shards is associated with a first shard group 202(1) and a second set of unique key shards is associated with a second shard group 202(N)), a first quorum (e.g., being satisfied by one unique key shard) associated with a first shard group 202(1) associated with the user wallet, and/or a second quorum (e.g., being satisfied by one of various combinations of two unique key shards) associated with a second shard group 202(N) associated with the user wallet. In some examples, the signing device(s) 204(1)-(3) of the first shard group 202(1) may be configured as datacenter-based computing devices having a signing client 206(1)-(3) associated with the user wallet (e.g., portion(s) of datacenter resources owned and/or assigned to the user owning/operating the user device 104) and/or the signing device(s) 204(4)-(N) may be configured as commodity hardware computing devices that are unassociated with a datacenter having a signing client 206(4)-(N) associated with the user wallet (e.g., personal computing devices associated with the user owning/operating user device 104). The user device 104 may send a request to the digital asset exchange platform 102 to sign a transaction associated with the user wallet. As such, the digital asset exchange platform 102 may send a request to the signing devices 204(1)-(3) associated with the first shard group 202(1) for the first set of unique key shards 208(1)-(3) and/or a request to the signing devices 204(4)-(N) associated with the second shard group 202(N) for the second set of unique key shards 208(4)-208(N). The digital asset exchange platform 102 may be configured to sign the transaction if the first quorum and the second quorum are met. That is, if any of the signing client devices 204(1)-(3) associated with the first shard group 202(1) returns a key shard from the first set of unique key shards 208(1)-(3) and two or more of the signing client devices 204(4)-(N) associated with the second shard group 202(N) return two or more key shards from the second set of unique key shards 208(N) which satisfy one of the various combinations specified by the second quorum, the digital asset exchange platform 102 may be configured to sign the transaction. Quorums are described in more detail below with respect to FIGS. 3A and 3B.

While the first shard group 202(1) having three signing devices 204(1)-(3) and the second shard group 202(N) having five signing devices 204(4)-(N) are illustrated, any number of shard groups 202 having any number of signing devices 204 may be utilized to implement the technologies described herein. Additionally, while eight key shards 208 (1)-(N) are illustrated, any number of key shards 208 may be utilized to implement the technologies described herein.

Figure 3A:
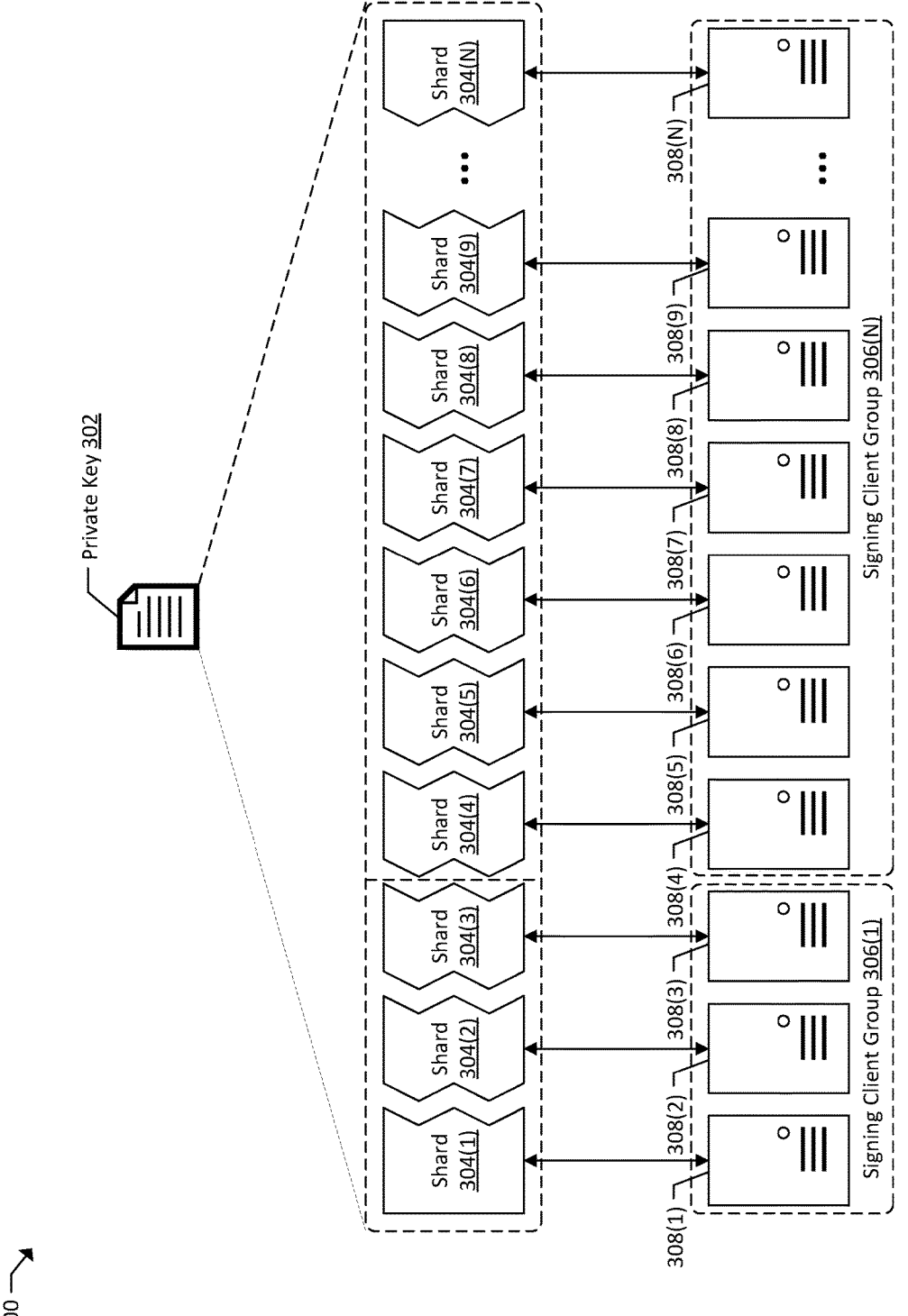
FIG. 3A illustrates an example diagram of signing client groups and corresponding unique key shards of a private key.
Figure 3B:
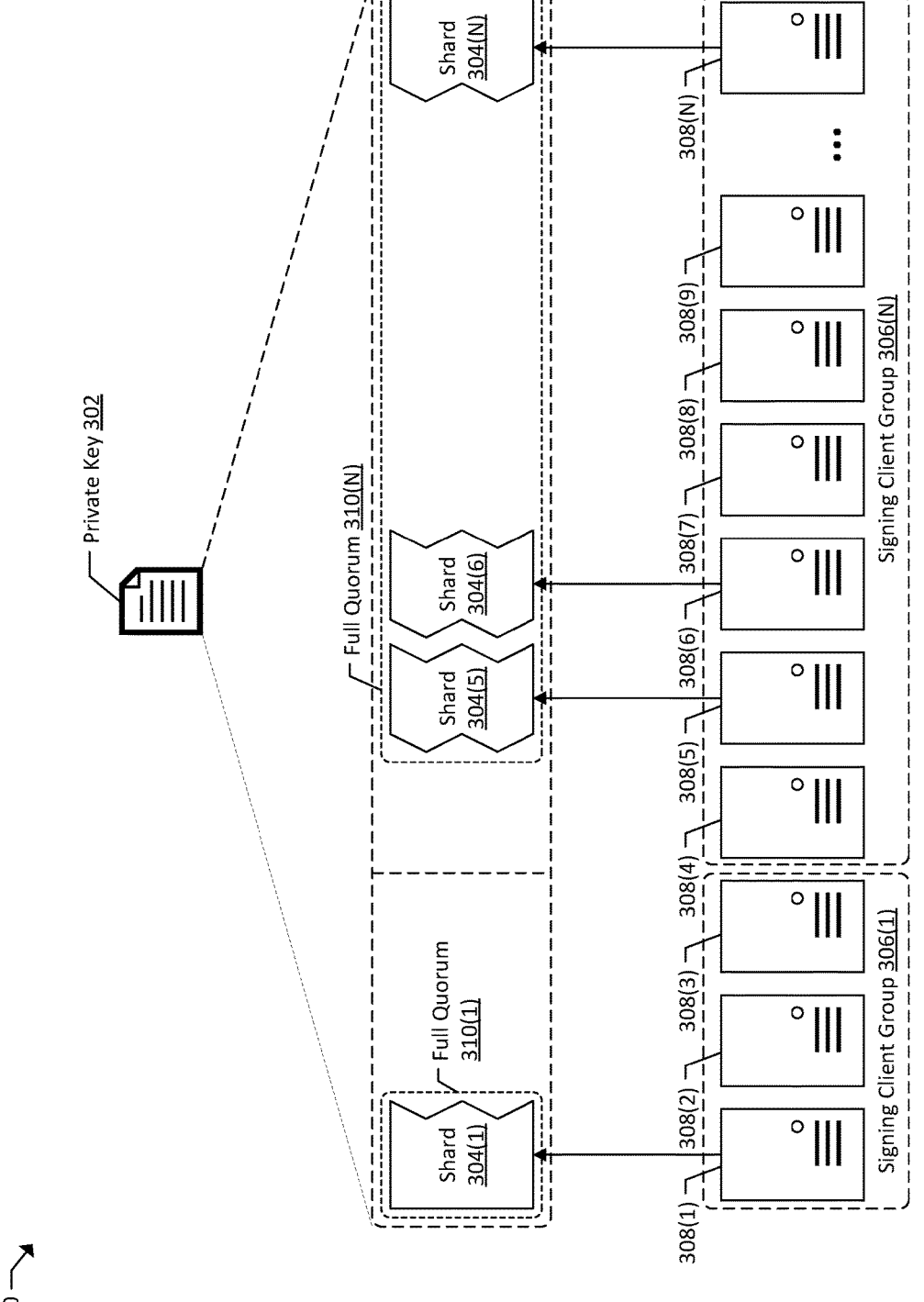
FIG. 3B illustrates an example diagram of signing client groups and corresponding full quorums associated with the unique key shards of a private key.

FIGS. 3A and 3B illustrate an example diagram 300 of a private key 302 being split into key shards 304(1)-(N) by corresponding signing client groups 306(1)-(N), each including one or more signing client devices 308(1)-(N), and corresponding full quorums being satisfied by the unique key shards of the private key being returned by individual signing client devices 308(1)-(N), where N may be any integer greater than 1. The techniques described with respect to FIGS. 3A and 3B may be implemented and/or executed by the digital asset exchange platform 102, as described with respect to FIG. 1.

Turning to FIG. 3A, take, for example, a user requesting to register with the digital asset exchange platform 102. The digital asset exchange platform 102 may receive the request from a user device to register for a user account associated with the digital asset exchange platform 102. In response to the request, the digital asset exchange platform 102 may generate a user wallet in association with the user account. The user wallet may be configured to store digital assets of one or more types (e.g., coins, tokens, and the like) and/or transactions associated with the wallet may be authenticated (or signed using a private key 302). In some examples, the registration request may include configuration data associated with the establishment of the user account and/or the wallet. In some examples, the configuration data may be utilized by the digital asset exchange platform to generate instructions configured to cause the signing client devices 308 to generate key shards 304 of a private key 302. For example, the configuration data may indicate, for the private key 302 associated with the wallet, a number of different shards 304 that the private key 302 should be split into. While ten shards 304(1)-(N) and two signing client groups 306(1), 306(N) are illustrated, for example purposes, the private key 302 may be split into first unique key shards 304(1)-(3) and second unique key shards 304(4)-(N) and a first signing client group 306(1) and a second signing client group 306(N) may be associated with the user wallet.

The configuration data may also be utilized by the digital asset exchange platform 102 to determine signing client groups 306 to generate and/or store respective shards 304 of the private key 302. In some examples, the signing client devices 308 included in the signing client groups 306 may be under control of the user, under control of the digital asset exchange platform 102, and/or under control of one or more third-party entities. For example, the configuration data may indicate, for the unique key shards 304 of the private key 302 associated with the blockchain wallet, types of signing client groups 306 to be utilized by the digital asset exchange platform to store the shards 304. As an example, the configuration data may indicate that first unique shards 304(1)-(3) of the private key 302 are to be generated by and/or stored by a first signing client group 306(1) including signing client devices 308(1)-308(3) configured as datacenter-based computing systems. Additionally, or alternatively, the configuration data may indicate that second unique key shards 304(4)-(N) of the private key are to be generated by and/or stored by a second signing client group 306(N) of signing client devices 308(4)-308(N), different from the first signing client group 306(1) and configured as commodity hardware computing systems deployed outside of datacenter (s). As an example, the first signing client group 306(1) may include three signing client devices 308(1)-(3) and the second signing client group 306(2) may include seven signing client devices 308(4)-(N).

The digital asset exchange platform 102 may be configured to distribute the instructions to generate the shards 304 to individual signing client devices 308 associated with corresponding signing client groups 306. For example, the digital asset exchange platform 102 may send first instructions to generate the first unique key shards 304(1)-(3) to each of the three signing client devices 308(1)-(3) of the first signing client group 306(1) and/or second instructions to generate the second unique key shards 304(4)-(N) to each of the seven signing client devices of the second signing client group 306(N). Once the signing client devices 308 of a particular signing client group 306 receive the instructions, the corresponding signing client devices 308 of the particular group may collaboratively generate the unique key shards 304.

While FIG. 3A illustrates a private key 302 split into ten shards 304(1)-(N) being distributed to two signing client groups 306(1), 306(N), a private key 302 may be split into any number of shards 304 and distributed to any number of signing client groups 306 to implement the technologies described herein.

Turning to FIG. 3B, the configuration data may be further utilized by the digital asset exchange platform 102 to determine a full quorum of shards 304 required to produce the private key 302 associated with a wallet. For example, the configuration data may indicate, for each signing client group 306, a quorum representing the unique key shards 304 of the private key 302 required by the digital asset exchange platform 102 to sign a transaction associated with the wallet. As such, the digital asset exchange platform 102 may configure the first signing client group 306(1) with a first quorum 310(1) (e.g., being satisfied by one of the first unique key shards 304(1)-304(N)) and/or the second signing client group 306(2) with a second quorum 310(N) (e.g., being satisfied by one of various combinations of three of the second unique key shards 304(4)-304(N)). Such a configuration would require one of the three signing client devices 308(1)-(3) associated with the first signing client group

306(1) to return one of the first unique key shards 304(1)-(3) to the digital asset exchange platform 102 and/or three or more of the seven signing client devices 308(4)-(N) associated with the second signing client group 306(N) to return three or more of the second unique key shards 304(4)-(N) that satisfy at least one of the various combinations of the second unique key shards 304(4)-(N) to the digital asset exchange platform 102 upon request in order to authorize a transaction (or otherwise produce the private key 302). For example, as illustrated in FIG. 3B, three signing client devices 308(5), 308(6), and 308(N) returned their unique key shard 304(5), 304(6), and 304(N), respectively, and the second quorum associated with the second signing client group 306(N) may determined to be a full quorum 310(N) (e.g., the key shards 304 that were returned satisfy the second quorum).

Figure 5:
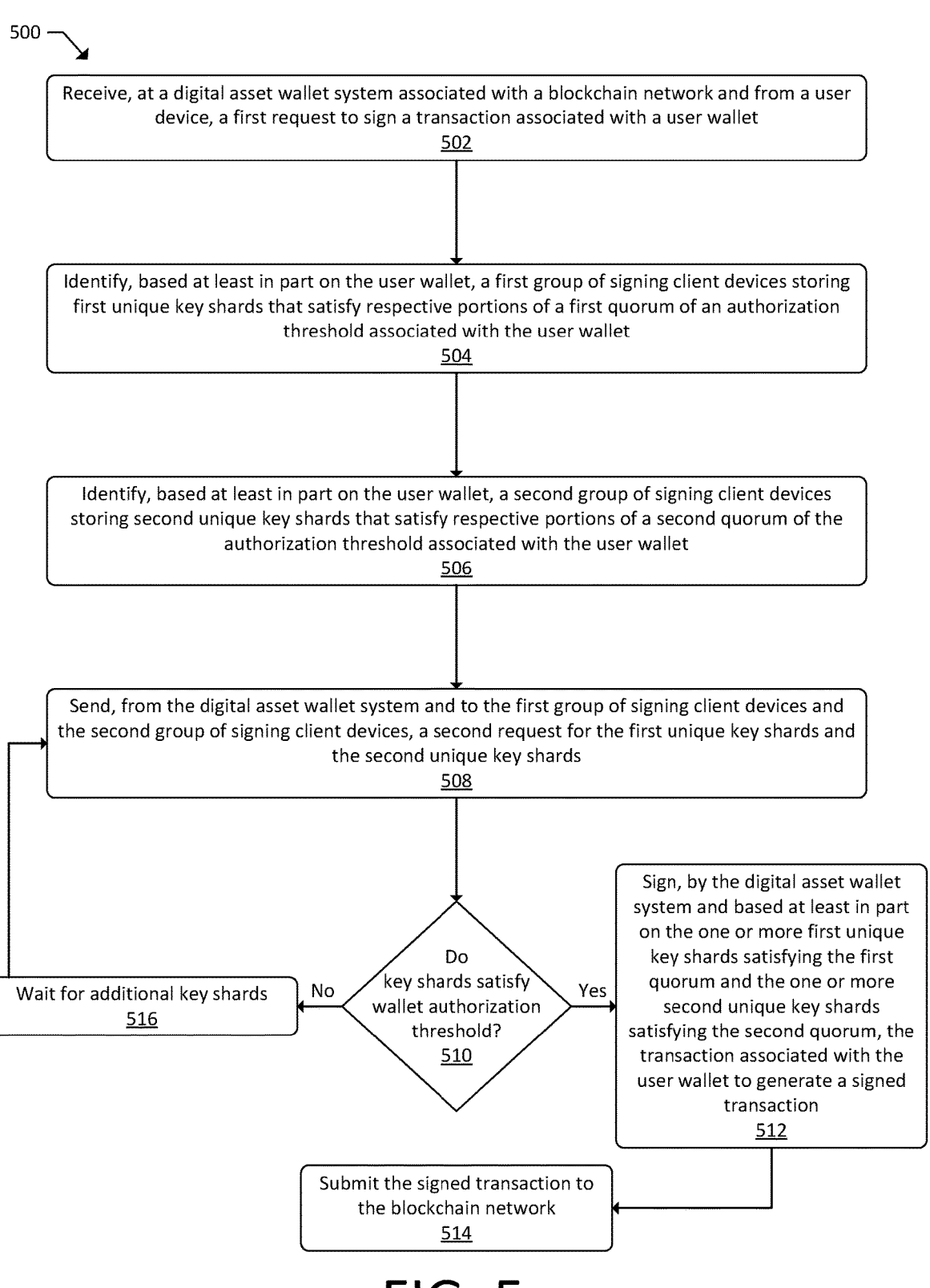
FIG. 5 illustrates a flow diagram of an example process for a digital asset exchange platform to obtain unique key shards from signing clients and use the unique key shards to authorize a transaction associated with a blockchain wallet.

FIGS. 4-6 illustrate processes 400-600 for digital asset exchange platforms. The processes 400-600 described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes 400-600 are described with reference to the environments, architectures and systems described in the examples herein, such as, for example those described with respect to FIGS. 1-3B, 7, and 8, although the processes 400-600 may be implemented in a wide variety of other environments, architectures and systems.

FIG. 4 illustrates a flow diagram of an example process 400 for a digital asset exchange platform to cause respective groups of signing clients to generate unique key shards associated with a blockchain wallet. The order in which the operations or steps are described is not intended to be construed as a limitation, and any number of the described operations may be combined in any order and/or in parallel to implement process 400.

At block 402, the process 400 may include receiving, at a digital asset wallet system (or a service offered by the system) associated with a blockchain network and from a first user device, a first request to register a first user wallet with the digital asset wallet system. In some examples, the first request may be a request to create the first wallet with the digital asset wallet system. Additionally, or alternatively, the first wallet may already be established, and the first request may be a request to register the established first wallet with the digital asset wallet system. In some examples, the digital asset wallet system and the first user device may be configured as the digital asset exchange platform 102 and the user device 104 as described with respect to FIGS. 1 and 2, respectively.

At block 404, the process 400 may include generating, by the digital asset wallet system, an authorization threshold representing a first quorum of first unique key shards. Additionally, or alternatively, the authorization threshold may represent a second quorum of second unique key shards. In some examples, the first quorum and/or the second quorum may be required by the digital asset wallet system to authorize transactions associated with the first user wallet. Additionally, or alternatively, the first quorum and/or the second quorum may be required to produce a private key utilized by the digital asset wallet system to authorize the transactions. In some examples, the private key may correspond to the private key 142, 302 as described with respect to FIGS. 1 and 3. Additionally, or alternatively, the first quorum and/or the second quorum may be configured as any of the quorums described with respect to FIGS. 1-3B.

At block 406, the process 400 may include generating, by the digital asset wallet system, a first instruction configured to, when sent to a first group of signing client devices, cause the first group of signing client devices to collaboratively create the first unique key shards associated with the first quorum. In some examples, the generation of the first unique key shards may include any of the operations as described with respect to FIGS. 1-3B. In some examples, the private key and the first unique key shards may correspond to the private key 142, 302 and the shards 144, 208, 304 as described with respect to FIGS. 1-3B.

At block 408, the process 400 may include generating, by the digital asset wallet system, a second instruction configured to, when sent to a second group of signing client devices, cause the second group of signing client devices to collaboratively create the second unique key shards associated with the second quorum. In some examples, generation of the second unique key shards may include any of the operations as described with respect to FIGS. 1-3B. Additionally, or alternatively, the private key and/or the second unique key shards may correspond to the private key 142, 302, and the shards 144, 208, 304, as described with respect to FIGS. 1-3B.

At block 410, the process 400 may include sending, by the digital asset wallet system and to individual ones of the first group of signing client devices, the first instruction. In some examples, the first group of signing client devices may be deployed in association with a datacenter. In some examples, the first group of signing client devices and the individual ones of the first group of signing client devices may correspond to the signing client group 106(1), 306(1), and the device(s) 146, 308(1)-(3) as described with respect to FIGS. 1, 3A, and 3B.

At block 412, the process 400 may include sending, by the digital asset wallet system and to individual ones of the second group of signing client devices, the second instruction. In some examples, the second group of signing client devices are second user devices. In some examples, the second group of signing client devices and the individual ones of the second group of signing client devices may correspond to the signing client group 106(2), 306(N), and the device(s) 148, 308(4)-308(N) as described with respect to FIGS. 1, 3A, and 3B.

At block 414, the process 400 may include storing, by the digital asset wallet system, the authorization threshold representing the first quorum and the second quorum in association with the first user wallet.

In some examples, the first request may include configuration data associated with the user wallet. Additionally, or alternatively, the configuration data may correspond to the configuration data as described with respect to FIGS. 1-3. Additionally, or alternatively, the process 400 may include determining, based at least in part on the configuration data, a the first quorum and/or the second quorum. Additionally, or alternatively, sending the first instruction to the individual ones of the first group of signing client devices may be based at least in part on the configuration data. Additionally, or alternatively, sending the second instruction to the second individual ones of the second group of signing client devices may be based at least in part on the configuration data.

In some examples, the authorization threshold associated with the user wallet may represents individual ones of the first unique key shards and individual ones of the second unique key shards that are required to produce a private key associated with the first user wallet. In some examples, the private key may be utilized by the digital asset wallet system to authorize the transactions associated with the first user wallet.

In some examples, collaboratively creating the first unique key shards is based at least in part on at least one of a sharding algorithm, such as, for example, algorithmic sharding, linear hash sharding, consistent hash sharding, range sharding, and/or any other sharding algorithm to generate key shards of a private key and/or a secret sharing algorithm, such as, for example Shamir's secret sharing algorithm, Blakely's secret sharing algorithm, Mignotte's secret sharing algorithm, Asmuth-Bloom's secret sharing algorithm, and/or any other secret sharing algorithm to generate key shards and/or signatures of a private key.

Additionally, or alternatively, the process 400 may include storing, by the digital asset wallet system, device information associated with signing client devices associated with the first user wallet. In some examples, the device information may indicate at least one of a location associated with individual ones of the signing client devices, a configuration associated with the individual ones of the signing client devices, a status associated with the individual ones of the signing client devices, hardware associated with the individual ones of the signing client devices, software associated with the individual ones of the signing client devices, and/or an identifier associated with the individual ones of the signing client devices. Additionally, or alternatively, the process 400 may include generating, by the digital asset wallet system, the first group of signing client devices based at least in part on the device information associated with the first individual signing client devices. Additionally, or alternatively, the process 400 may include generating, by the digital asset wallet system, the second group of signing client devices based at least in part on the device information associated with the second individual signing client devices.

In some examples, the first quorum of the authorization threshold is satisfied based on a threshold number of the first unique key shards. Additionally, or alternatively, the second quorum of the authorization threshold is satisfied based on a specific configuration of the second unique key shards.

Additionally, or alternatively, the process 400 may include sending the first instructions to the individual ones of the first group of signing client devices via individual secure communication tunnels.

Additionally, or alternatively, the process 400 may include receiving, at the digital asset wallet system and from the first user device, a second request to sign a transaction associated with the user wallet. Additionally, or alternatively, the process 400 may include identifying, based at least in part on the first user wallet, the first group of signing client devices and the second group of signing client devices. Additionally, or alternatively, the process 400 may include sending, from the digital asset wallet system and to the first group of signing client devices and the second group of signing client devices, a third request for the first unique key shards and the second unique key shards. Additionally, or alternatively, the process 400 may include receiving, by the digital asset wallet system and from one or more first signing client devices of the first group of signing client devices, one or more of the first unique key shards. Additionally, or alternatively, the process 400 may include receiving, by the digital asset wallet system and from one or more second signing client devices of the second group of signing client devices, one or more of the second unique key shards. Additionally, or alternatively, the process 400 may include determining that the one or more first unique key shards satisfies the first quorum and the one or more second unique key shards satisfies the second quorum associated with the first user wallet. Additionally, or alternatively, the process 400 may include signing, by the digital asset wallet system and based at least in part on the one or more first unique key shards satisfying the first quorum and the one or more second unique key shards satisfying the second quorum, the transaction associated with the first user wallet. Additionally, or alternatively, the process 400 may include submitting the signed transaction to the blockchain network.

FIG. 5 illustrates a flow diagram of an example process 500 for a digital asset exchange platform to obtain unique key shards from signing clients and use the unique key shards to authorize a transaction associated with a user blockchain wallet. The order in which the operations or steps are described is not intended to be construed as a limitation, and any number of the described operations may be combined in any order and/or in parallel to implement process 500.

At block 502, the process 500 may include receiving, at a digital asset wallet system (or a service offered by the system) associated with a blockchain network and from a user device, a first request to sign a transaction associated with a user wallet. In some examples, the transaction may be signed using a private key associated with the user wallet. In some examples, the digital asset wallet system may be configured as the digital asset exchange platform 102 as described with respect to FIGS. 1 and 2. Additionally, or alternatively, the first request may comprise a request to send digital assets to another user wallet and/or to exchange digital assets associated with the user wallet for another type of funds (e.g., another type of digital assets, another type of currency, such as, for example, USD).

At block 504, the process 500 may include identifying, based at least in part on the user wallet, a first group of signing client devices storing first unique key shards that satisfy respective portions of a first quorum of an authorization threshold associated with the user wallet. In some examples, the portions may represent one or more thresholds (e.g., configurations or arrangements of first unique key shards) associated with the user wallet. In some examples, the first group of signing client devices and the one or more first unique key shards may correspond to the signing client groups 106, 202, 306 and the shards 144, 208, 304 as described with respect to FIGS. 1-3B.

At block 506, the process 500 may include identifying, based at least in part on the user wallet, a second group of signing client devices storing second unique key shards that satisfy respective portions of a second quorum of the authorization threshold associated with the user wallet. In some examples, the portions may represent one or more thresholds (e.g., configurations or arrangements of second unique key shards) associated with the user wallet. In some examples, the second group of signing client devices and the one or more second unique key shards may correspond to the signing client groups 106, 202, 306 and the shards 144, 208, 304 as described with respect to FIGS. 1-3B

At block 508, the process 500 may include sending, from the digital asset wallet system and to the first group of signing client devices and the second group of signing client devices, a second request for the first unique key shards and the second unique key shards.

At block 510, the process 500 may include determining that the one or more first unique key shards satisfies the first quorum and the one or more second unique key shards satisfies the second quorum. In some examples, determining that the one or more first unique key shards satisfies the first quorum and/or the one or more second unique key shards satisfies the second quorum may be based on any of the techniques described above with respect to FIGS. 1-3B.

Additionally, or alternatively, in examples where it is determined that the one or more first unique key shards satisfies the first quorum and the one or more second unique key shards satisfies the second quorum, the process 500 may include, at block 512, signing, by the digital asset wallet system and based at least in part on the one or more first unique key shards satisfying the first quorum and the one or more second unique key shards satisfying the second quorum, the transaction associated with the user wallet to generate a signed transaction. At block 514, the process 500 may include submitting the signed transaction to the blockchain network.

In examples where it is determined that the one or more first unique key shards does not satisfy the first quorum and/or the one or more second unique key shards does not satisfy the second quorum, the process 500 may include, at block 516, waiting for additional first unique key shards and/or second unique key shards. After waiting for a threshold period of time, a portion of the process 500 may restart at block 508. Additionally, or alternatively, after waiting for a threshold period of time, the process 500 may include declining the transaction request.

In some examples, the signed transaction is generated using a private key associated with the user wallet.

In some examples, the first quorum of the authorization threshold is satisfied based on receiving a threshold number of the first unique key shards. Additionally, or alternatively, the second quorum of the authorization threshold is satisfied based on receiving a specific configuration of the second unique key shards.

In some examples, the first group of signing client devices may comprise one or more first computing devices deployed within a datacenter. Additionally, or alternatively, the second group of signing client devices may comprise one or more second computing devices deployed outside of the datacenter.

Additionally, or alternatively, the process 500 may include receiving the one or more of the first unique key shards from the one or more first signing client devices of the first group of signing client devices via individual secure connection tunnels.

Additionally, or alternatively, the process 500 may include storing, by the digital asset wallet system, a third unique key shard that satisfies a respective portion of one of the first quorum or the second quorum. Additionally, or alternatively, the process 500 may include determining that the third unique key shard satisfies one of the first quorum or the second quorum. In some examples, signing the transaction associated with the user wallet is further based at least in part on the third unique key shard satisfying one of the first quorum or the second quorum.

FIG. 6 illustrates an example process 600 for a digital asset exchange platform to cause signing client groups to generate new unique key shards associated with a blockchain wallet, and invalidate the previous unique key shards associated with the blockchain wallet. The order in which the operations or steps are described is not intended to be construed as a limitation, and any number of the described operations may be combined in any order and/or in parallel to implement process 600.

At block 602, the process 600 may include storing, by the digital asset wallet system associated with a blockchain network, a first user wallet and a first authorization threshold representing first quorum of first unique key shards and/or a second quorum of second unique key shards. In some examples, the first quorum and the second quorum may be required to authorize transactions associated with the first user wallet. In some examples, the digital asset wallet system, the first unique key shards, first quorum, the second unique key shards, the second quorum, the signing client devices, may be configured as the digital asset exchange platform 102, the (first) shards 144, 208, the first quorum, the (second) shards 144, 208, and the signing client groups 106, 202, as described with respect to FIGS. 1 and 2.

At block 604, the process 600 may include determining, by the digital asset wallet system, to generate third unique key shards associated with at least one of the first quorum or the second quorum.

At block 606, the process 600 may include generating, by the digital asset wallet system, an instruction configured to, when sent to a first group of signing client devices, cause the first group of signing client devices to collaboratively create the third unique key shards associated with at least one of the first quorum or the second quorum.

At block 608, the process 600 may include sending, from the digital asset wallet system and to individual ones of the first group of the signing client devices, the instruction.

At block 610, the process 600 may include storing, by the digital asset wallet system, a second authorization threshold representing the third unique key shards in association with at least one of the first quorum or the second quorum associated with the first user wallet.

Additionally, or alternatively, the process 600 may include receiving a request to generate the third unique key shards associated with the first quorum or the second quorum from a user account associated with the first user wallet. Additionally, or alternatively, determining to generate the third unique key shards is based at least in part on receiving the request from the user account.

Additionally, or alternatively, the process 600 may include receiving a request to generate the third unique key shards associated with the first quorum or the second quorum from a signing client device of the first group of signing client devices. Additionally, or alternatively, determining to generate the third unique key shards is based at least in part on receiving the request from the signing client device.

Additionally, or alternatively, the process 600 may include determining, by the digital asset wallet system, that the first group of signing client devices associated with the first user wallet includes a number of available signing client devices is less than a threshold number of available signing client devices. Additionally, or alternatively, determining to generate the third unique key shards associated with the first quorum or the second quorum is based at least in part on determining that the number of available signing client devices is less than the threshold number of available signing client devices.

Additionally, or alternatively, the process 600 may include sending, by the digital asset wallet system and to at least one signing client device of the first group of signing client devices, a communication indicating that one of the first unique key shards or the second unique key shards have been revoked. In some examples, the communication causing the at least one signing client device to delete the one of the first unique key shards or the second unique key shards.

In some examples, the first group of signing client devices may comprise one or more first computing devices deployed within a datacenter. Additionally, or alternatively, the first group of signing client devices may comprise one or more second computing devices deployed outside of the datacenter.

FIG. 7 illustrates a schematic diagram 700 of exemplary participants in a system employing a digital asset exchange. In a digital asset exchange, one or more customers of the exchange (e.g., User 1, User 2, User 3, etc.) connect via a network 710 (e.g., the Internet, a local area network, a wide area network, etc.) to a digital asset exchange computer system 712, using respective one or more user electronic devices 706 (e.g., 706(*a*), 706(*b*), . . . , 706(*n*)), such as computers, laptops, tablet computers, televisions, mobile phones, smartphones, and/or PDAs, etc. Each user may also have user bank accounts 704 held at one or more corresponding banks 702 (e.g., User 1 will have a User 1 Bank Account 704(*a*) at Bank 702(*a*), User 2 will have User 2 Bank Account 704(*b*) at Bank 702(*b*), etc.), which in turn may be accessed by a corresponding user device (e.g., User 1 Device 706(*a*), User 2 Device 706(*b*), etc.). In embodiments, functionality may be installed on a bank mobile application, which may access an application programing interface (API) of one or more exchanges. Similarly, each user may (or may not) also maintain a digital client (e.g., User 1 Digital Client 708(*a*), User 2 Digital Client 708(*b*), etc.), either on their respective user device or in some cases offline, to facilitate access to their respective bank accounts from a user device and/or from a digital client or digital address associated therewith.

The participants may be connected directly and/or indirectly, such as through a data network 710, as discussed herein. Users of a digital asset exchange may be customers of the digital asset exchange, such as digital asset buyers and/or digital asset sellers. Digital asset buyers may pay fiat (e.g., U.S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few) in exchange for digital assets. Digital asset sellers may exchange digital assets for fiat or other digital assets.

The digital asset exchange computer systems 712 may track the users' respective digital assets in the one or more exchange digital asset ledger databases 716 associated with the respective digital asset. For example, respective users' BITCOIN assets available for trading will be tracked in a BITCOIN exchange ledger. In turn, the respective digital assets themselves will be maintained in exchange digital clients that are controlled by the one or more private keys associated with each digital client.

Similarly, the digital asset exchange computer system 712 will track the users' respective fiat in one or more exchange fiat databases 718 associated with the respective fiat. For example, respective users' U.S. Dollar assets available for trading will be tracked in a U.S. Dollar exchange ledger. In turn, the respective fiat will be maintained in one or more exchange bank accounts 722 in respective exchange bank(s) 720, that are typically held in the name of the digital asset exchange on behalf of its customers. A digital asset exchange may have one or more bank accounts, e.g., bank account 722, held at one or more banks 720, such as exchange banks or exchange partner banks, which are banks associated with and/or in partnership with the digital asset exchange. In embodiments, exchanges may access other repositories for fiat currency. An exchange bank account 722 may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third-party. Upon receipt by the appropriate recipient of the requisite amount of digital assets, the digital asset exchange may authorize the release of the fiat currency to the digital asset seller. In embodiments, an exchange may hold, e.g., as a custodian, fiat in bank accounts and digital assets in digital clients at associated digital asset addresses. In embodiments, instead of using bank accounts, other stable investment instruments such as money market mutual funds, treasury bills, CDs, low risk bonds, to name a few, may be used.

A digital asset exchange may have one or more digital asset exchange computer systems 712, which can include software running on one or more processors, as discussed herein, as well as computer-readable memory comprising one or more databases. A digital asset exchange can include one or more exchange digital asset clients, e.g., digital asset client 714. Exchange digital client may be used to store digital assets in one or more denominations from one or more parties to a transaction. In embodiments, the exchange digital clients may store digital assets owned by the digital asset exchange, which may be used when an exchange is a counterparty to an exchange transaction, and which can allow exchange transactions to occur even when a buyer and a seller are not otherwise both available and in agreement on transaction terms. Typically, access to such exchange digital clients is controlled by one or more private keys.

FIG. 8 illustrates a schematic diagram 800 of additional features associated with a digital asset exchange. Each entity may operate one or more computer systems. Computer systems may be connected directly or indirectly, such as through a data network (e.g., the Internet, a local area network, a wide area network, a proprietary network, to name a few). The digital asset exchange 802 may be associated with a digital asset exchange computer system 712, exchange digital asset clients 714, for example, associated with one or more digital asset addresses (e.g., BIT-COIN clients, ETHEREUM clients, LITECOIN clients, to name a few), customer banks 818 having customer fiat bank accounts 820, a digital asset network transaction ledger 828 (e.g., the BITCOIN blockchain, the ETHEREUM block-chain, the LITECOIN blockchain, to name a few), a digital asset network (e.g., the BITCOIN network, the ETHEREUM network, the LITECOIN network, to name a few), one or more exchange customers using one or more customer user device 706(*a*), one or more exchange digital asset electronic ledger(s) 716 one or more exchange digital asset vaults 808, one or more exchange fiat electronic ledger databases(s) 718, and one or more exchange partner banks 720, which can have exchange bank account(s) 722 for holding pooled customer fiat, to name a few. The exchange digital asset vaults 808 can store a plurality of digital asset clients, which may be pooled exchange customer digital asset accounts 810 with associated digital asset addresses. In embodiments, the digital asset exchange 802 may have one or more partner banks 720, each with one or more respective exchange bank account(s) 722. Such account(s) may be associated with insurance protection, such as FDIC insur-ance protection in the U.S. In embodiments, the digital asset exchange 802 may also communicate with an authenticator computer system 812 (to authenticate users, e.g., using multi-factor authentication and/or comparisons to databases of flagged users, to name a few), an index computer system 814 (e.g., for generating and/or providing a digital asset index, which may be a price index), and/or a market maker computer system 816, to name a few. A market maker may be an exchange user, like a broker dealer or other entity, that provides liquidity for the digital asset exchange 802 by purchasing or selling digital assets. The user device 706(*a*) may include a digital asset client 822, which may include a transaction ledger 824 and digital asset source code 826.

The digital asset exchange 802 may employ an electronic ledger system to track customer digital assets and/or cus-tomer fiat holdings. Such a system may allow rapid elec-tronic transactions among exchange customers and/or between exchange customers and the digital asset exchange 802 itself using its own digital asset and fiat holdings or those of its sponsor or owner. In embodiments, the electronic ledger system may facilitate rapid computer-based auto-mated trading, which may comprise use by one or more computer systems of a trading API provided by the digital asset exchange 802. In embodiments, the electronic ledger system may also be used in conjunction with hot client digital asset security systems (e.g., where one or more private keys are maintained on a computer system that is immediately accessible), and/or cold storage digital asset security systems by the digital asset exchange 802 (e.g., where one or more private keys are maintained on a com-puter system that is off-line), to name a few. Fiat (e.g., USD) and digital assets (e.g., BITCOIN, ETHER, LITECOIN, to name a few) can be electronically credited and/or electroni-cally debited from respective (e.g., fiat and digital asset) electronic ledgers.

Clearing of transactions may be recorded nearly instan-taneously on the electronic ledgers. Deposits of fiat with the digital asset exchange 802 and withdrawals from the digital asset exchange 802 may be recorded on the exchange electronic fiat ledger 806, which may be provided in the exchange electronic fiat ledger database 718, while deposits and withdrawals of digital assets may be recorded on the exchange electronic digital asset ledger 804, which may be provided in the exchange digital asset ledger database 716. Electronic ledgers may be maintained using one or more computers operated by the digital asset exchange 802, its sponsor and/or agent, and stored on non-transitory com-puter-readable memory operatively connected to such one or more computers. In embodiments, electronic ledgers can be in the form of a database.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying draw-ings are non-limiting embodiments. The features illustrated or described in connection with one embodiment may be combined with the features of other embodiments, including as between systems and methods. Such modifications and variations are intended to be included within the scope of the appended claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A digital asset wallet system comprising:

one or more processors; and non-transitory computer-readable media storing instructions that, when executed by the one or more processors, cause the one or more processors to perform operations comprising:

receiving, at the digital asset wallet system associated with a blockchain network and from a first user device, a first request to register a first user wallet with the digital asset wallet system;

generating, by the digital asset wallet system, an authorization threshold representing a first quorum of first unique key shards and a second quorum of second unique key shards, the first quorum and the second quorum being required to produce a private key associated with the first user wallet;

generating, by the digital asset wallet system, a first instruction configured to, when sent to a first group of signing client devices, cause the first group of signing client devices to collaboratively create the first unique key shards associated with the first quorum utilizing a hash function;

generating, by the digital asset wallet system, a second instruction configured to, when sent to a second group of signing client devices, cause the second group of signing client devices to collaboratively create the second unique key shards associated with the second quorum utilizing the hash function;

sending, by the digital asset wallet system and to individual ones of the first group of signing client devices, the first instruction;

sending, by the digital asset wallet system and to individual ones of the second group of signing client devices, the second instruction;

receiving, by the digital asset wallet system, a first set of unique key shards from the first group of signing client devices and a second set of unique key shards from the second group of signing client devices;

producing, by the digital asset wallet system, the private key based on the received first set of unique key shards and the second set of unique key shards;

signing and authorizing, based at least in part on the private key, a transaction associated with the first user wallet to update a digital asset balance associated with the first user wallet; and storing, by the digital asset wallet system, the authorization threshold representing the first quorum and the second quorum in association with the first user wallet.

2. The digital asset wallet system of claim 1, wherein the first request includes configuration data associated with the user wallet, and the operations further comprising:

determining, based at least in part on the configuration data, the first quorum and the second quorum; and wherein:

sending the first instruction to the individual ones of the first group of signing client devices is based at least in part on the configuration data; and sending the second instruction to the individual ones of the second group of signing client devices is based at least in part on the configuration data.

3. The system of claim 1, wherein the authorization threshold associated with the user wallet represents individual ones of the first unique key shards and individual ones of the second unique key shards that are required to produce a private key to authorize the transactions associated with the first user wallet.

4. The system of claim 1, wherein collaboratively creating the first unique key shards is based at least in part on at least one of a sharding algorithm or a secret sharing algorithm.

5. The system of claim 4, the operations further comprising:

storing, by the digital asset wallet system, device information associated with signing client devices associated with the first user wallet, the device information indicating at least one of:

a location associated with individual ones of the signing client devices;

a configuration associated with the individual ones of the signing client devices;

a status associated with the individual ones of the signing client devices;

hardware associated with the individual ones of the signing client devices;

software associated with the individual ones of the signing client devices; or an identifier associated with the individual ones of the signing client devices;

generating, by the digital asset wallet system, the first group of signing client devices based at least in part on the device information associated with the first individual signing client devices; and generating, by the digital asset wallet system, the second group of signing client devices based at least in part on the device information associated with the second individual signing client devices.

6. The system of claim 1, wherein:

the first quorum of the authorization threshold is satisfied based on a threshold number of the first unique key shards; and the second quorum of the authorization threshold is satisfied based on a specific configuration of the second unique key shards.

7. The system of claim 1, the operations further comprising sending the first instructions to the individual ones of the first group of signing client devices via individual secure communication tunnels.

8. The system of claim 1, the operations further comprising:

receiving, at the digital asset wallet system and from the first user device, a second request to sign a transaction associated with the user wallet;

identifying, based at least in part on the first user wallet, the first group of signing client devices and the second group of signing client devices;

sending, from the digital asset wallet system and to the first group of signing client devices and the second group of signing client devices, a third request for the first unique key shards and the second unique key shards;

determining, responsive to sending the third request, that one or more first unique key shards satisfies the first quorum and one or more second unique key shards satisfies the second quorum associated with the first user wallet;

causing, by the digital asset wallet system and based at least in part on the one or more first unique key shards satisfying the first quorum and the one or more second unique key shards satisfying the second quorum, the first group of signing client devices and the second group of signing client devices to sign the transaction associated with the first user wallet; and submitting the signed transaction to the blockchain network.

9. A method comprising:

receiving, at a digital asset wallet system associated with a blockchain network and from a first user device, a first request to register a first user wallet with the digital asset wallet system;

generating, by the digital asset wallet system, an authorization threshold representing a first quorum of first unique key shards and a second quorum of second unique key shards, the first quorum and the second quorum being required to produce a private key associated with the first user wallet;

generating, by the digital asset wallet system, a first instruction configured to, when sent to a first group of signing client devices, cause the first group of signing client devices to collaboratively create the first unique key shards associated with the first quorum utilizing a hash function;

generating, by the digital asset wallet system, a second instruction configured to, when sent to a second group of signing client devices, cause the second group of signing client devices to collaboratively create the second unique key shards associated with the second quorum utilizing the hash function;

sending, by the digital asset wallet system and to individual ones of the first group of signing client devices, the first instruction;

sending, by the digital asset wallet system and to individual ones of the second group of signing client devices, the second instruction;

receiving, by the digital asset wallet system, a first set of unique key shards from the first group of signing client devices and a second set of unique key shards from the second group of signing client devices;

producing, by the digital asset wallet system, the private key based on the received first set of unique key shards and the second set of unique key shards;

signing and authorizing, based at least in part on the private key, a transaction associated with the first user wallet to update a digital asset balance associated with the first user wallet; and storing, by the digital asset wallet system, the authorization threshold representing the first quorum and the second quorum in association with the first user wallet.

10. The method of claim 9, wherein the first request includes configuration data associated with the user wallet, and the method further comprising:

determining, based at least in part on the configuration data, the first quorum and the second quorum; and wherein:

sending the first instruction to the individual ones of the first group of signing client devices is based at least in part on the configuration data; and sending the second instruction to the individual ones of the second group of signing client devices is based at least in part on the configuration data.

11. The method of claim 9, wherein the authorization threshold associated with the user wallet represents individual ones of the first unique key shards and individual ones of the second unique key shards that are required to produce a private key to authorize the transactions associated with the first user wallet.

12. The method of claim 9, wherein collaboratively creating the first unique key shards is based at least in part on at least one of a sharding algorithm or a secret sharing algorithm.

13. The method of claim 12, further comprising:

storing, by the digital asset wallet system, device information associated with signing client devices associated with the first user wallet, the device information indicating at least one of:

a location associated with individual ones of the signing client devices;

a configuration associated with the individual ones of the signing client devices;

a status associated with the individual ones of the signing client devices;

hardware associated with the individual ones of the signing client devices;

software associated with the individual ones of the signing client devices; or an identifier associated with the individual ones of the signing client devices;

generating, by the digital asset wallet system, the first group of signing client devices based at least in part on the device information associated with the first individual signing client devices; and generating, by the digital asset wallet system, the second group of signing client devices based at least in part on the device information associated with the second individual signing client devices.

14. The method of claim 9, wherein:

the first quorum of the authorization threshold is satisfied based on a threshold number of the first unique key shards; and the second quorum of the authorization threshold is satisfied based on a specific configuration of the second unique key shards.

15. The method of claim 9, further comprising sending the first instructions to the individual ones of the first group of signing client devices via individual secure communication tunnels.

16. The method of claim 9, further comprising:

receiving, at the digital asset wallet system and from the first user device, a second request to sign a transaction associated with the user wallet;

identifying, based at least in part on the first user wallet, the first group of signing client devices and the second group of signing client devices;

sending, from the digital asset wallet system and to the first group of signing client devices and the second group of signing client devices, a third request for the first unique key shards and the second unique key shards;

determining, responsive to sending the third request, that one or more first unique key shards satisfies the first quorum and one or more second unique key shards satisfies the second quorum associated with the first user wallet;

causing, by the digital asset wallet system and based at least in part on the one or more first unique key shards satisfying the first quorum and the one or more second unique key shards satisfying the second quorum, the first group of signing client devices and the second group of signing client devices to sign the transaction associated with the first user wallet; and submitting the signed transaction to the blockchain network.

17. One or more non-transitory computer-readable media storing instructions that, when executed by a processor, cause the processor to perform operations comprising:

receiving, at the digital asset wallet system associated with a blockchain network and from a first user device, a first request to register a first user wallet with the digital asset wallet system;

generating, by the digital asset wallet system, an authorization threshold representing a first quorum of first unique key shards and a second quorum of second unique key shards, the first quorum and the second quorum being required to produce a private key associated with the first user wallet;

generating, by the digital asset wallet system, a first instruction configured to, when sent to a first group of signing client devices, cause the first group of signing client devices to collaboratively create the first unique key shards associated with the first quorum utilizing a hash function;

generating, by the digital asset wallet system, a second instruction configured to, when sent to a second group of signing client devices, cause the second group of signing client devices to collaboratively create the second unique key shards associated with the second quorum utilizing the hash function;

sending, by the digital asset wallet system and to individual ones of the first group of signing client devices, the first instruction;

sending, by the digital asset wallet system and to individual ones of the second group of signing client devices, the second instruction;

receiving, by the digital asset wallet system, a first set of unique key shards from the first group of signing client devices and a second set of unique key shards from the second group of signing client devices;

producing, by the digital asset wallet system, the private key based on the received first set of unique key shards and the second set of unique key shards;

signing and authorizing, based at least in part on the private key, a transaction associated with the first user wallet to update a digital asset balance associated with the first user wallet; and storing, by the digital asset wallet system, the authorization threshold representing the first quorum and the second quorum in association with the first user wallet.

18. The one or more non-transitory computer-readable media of claim 17, wherein the first request includes configuration data associated with the user wallet and the operations further comprising:

determining, based at least in part on the configuration data, the first quorum and the second quorum; and wherein:

sending the first instruction to the individual ones of the first group of signing client devices is based at least in part on the configuration data; and sending the second instruction to the individual ones of the second group of signing client devices is based at least in part on the configuration data.

19. The one or more non-transitory computer-readable media of claim 17, wherein the authorization threshold associated with the user wallet represents individual ones of the first unique key shards and individual ones of the second unique key shards that are required to produce a private key to authorize the transactions associated with the first user wallet.

20. The one or more non-transitory computer-readable media of claim 17, wherein collaboratively creating the first unique key shards is based at least in part on at least one of a sharding algorithm or a secret sharing algorithm.

* * * * *